(12) United States Patent
Noda et al.

(10) Patent No.: US 11,478,940 B2
(45) Date of Patent: Oct. 25, 2022

(54) ROTATIONAL STRUCTURE, ASSIST SYSTEM, AND ROBOT

(71) Applicant: ADVANCED TELECOMMUNICATIONS RESEARCH INSTITUTE INTERNATIONAL, Kyoto (JP)

(72) Inventors: Tomoyuki Noda, Kyoto (JP); Jun Morimoto, Kyoto (JP)

(73) Assignee: ADVANCED TELECOMMUNICATIONS RESEARCH INSTITUTE INTERNATIONAL, Soraku-Gun (JP)

(*) Notice: Subject to any disclaimer, the term of this patent is extended or adjusted under 35 U.S.C. 154(b) by 1113 days.

(21) Appl. No.: 16/076,958

(22) PCT Filed: Feb. 10, 2017

(86) PCT No.: PCT/JP2017/004986
§ 371 (c)(1),
(2) Date: Aug. 9, 2018

(87) PCT Pub. No.: WO2017/138651
PCT Pub. Date: Jul. 17, 2017

(65) Prior Publication Data
US 2019/0047161 A1  Feb. 14, 2019

(30) Foreign Application Priority Data
Feb. 10, 2016  (JP) .............................. JP2016-024159

(51) Int. Cl.
*B25J 13/08* (2006.01)
*B25J 17/00* (2006.01)
*F16C 35/04* (2006.01)
*F16B 15/02* (2006.01)
*A61H 1/02* (2006.01)
(Continued)

(52) U.S. Cl.
CPC .......... *B25J 13/088* (2013.01); *A61H 1/0274* (2013.01); *B25J 9/0009* (2013.01);
(Continued)

(58) Field of Classification Search
CPC ...... B25J 9/0006; B25J 9/0009; B25J 13/088; B25J 17/00; A61H 1/0274; A61H 3/00;
(Continued)

(56) References Cited

U.S. PATENT DOCUMENTS

| 5,000,058 A | 3/1991 | Andersson et al. |
| 9,855,654 B2 * | 1/2018 | Yagi ...................... B25J 9/0006 |

(Continued)

FOREIGN PATENT DOCUMENTS

| CN | 2474991 Y | 1/2002 |
| CN | 103376122 A * | 10/2013 ............... F16D 3/72 |

(Continued)

*Primary Examiner* — Adam D Rogers
(74) *Attorney, Agent, or Firm* — Birch, Stewart, Kolasch & Birch, LLP

(57) ABSTRACT

A rotational structure is configured such that a hollow portion, in which a base member is opposed to a rotational member, is formed around a shaft member. An encoder provided in the hollow portion includes a detection target member rotated together with one of the rotational member and the base member and having a physical quantity changing in a circumferential direction, and a detector capable of detecting the physical quantity of the detection target element and rotated together with the other of the rotational member and the base member.

18 Claims, 17 Drawing Sheets

(51) Int. Cl.
   *A61H 3/00*    (2006.01)
   *G01D 5/245*   (2006.01)
   *G01D 5/347*   (2006.01)
   *F16C 35/06*   (2006.01)
   *B25J 9/00*    (2006.01)
   *F15B 15/06*   (2006.01)

(52) U.S. Cl.
   CPC ............... *B25J 17/00* (2013.01); *F15B 15/06* (2013.01); *F16C 35/06* (2013.01); *G01D 5/245* (2013.01); *G01D 5/3473* (2013.01); *G01D 5/34738* (2013.01); *A61H 3/00* (2013.01); *A61H 2201/1246* (2013.01); *A61H 2201/5069* (2013.01); *B25J 9/0006* (2013.01)

(58) Field of Classification Search
   CPC .... A61H 2201/1246; A61H 2201/1409; A61H 2201/5069; A61H 2205/06; F15B 15/06; F16C 35/06; G01D 5/245; G01D 5/3473; G01D 5/34738
   See application file for complete search history.

(56) References Cited

U.S. PATENT DOCUMENTS 10,259,121 B2 * 4/2019 Osaka .................. B25J 19/0095
   10,807,244 B2 * 10/2020 Dohi ...................... B25J 13/088
   11,148,280 B2 * 10/2021 Kume .................... F16H 57/029
   11,185,975 B2 * 11/2021 Hyun ...................... B25J 9/0006
   2001/0018005 A1    8/2001 Karlinger
   2013/0084156 A1    4/2013 Shimamoto et al.
   2014/0212243 A1    7/2014 Yagi et al.
   2015/0173988 A1    6/2015 Tamai et al.
   2015/0192430 A1    7/2015 Blokland et al.
   2019/0047142 A1 *  2/2019 Noda ......................... B25J 9/08
   2021/0297018 A1 *  9/2021 Omata ...................... G01L 3/14

FOREIGN PATENT DOCUMENTS

EP    2 653 837 A1      10/2013
   EP    3372354 A1  *      9/2018
   GB     252438 A          5/1926
   JP    7-16007 U          3/1995
   JP    2001-201363 A      7/2001
   JP    2007-309352 A     11/2007
   JP    2008-215514 A      9/2008
   JP    2009-204316 A      9/2009
   JP    2011-258793 A     12/2011
   JP    2013-221921 A     10/2013
   JP    2014-61036 A       4/2014
   JP    2015-513682 A      5/2015
   JP    2015-127638 A      7/2015

* cited by examiner

ROTATIONAL STRUCTURE, ASSIST SYSTEM, AND ROBOT

TECHNICAL FIELD

The present invention relates to a rotational structure used for a joint structure of a robot or the like, and an assist system and a robot using the rotational structure.

BACKGROUND ART

Patent Document 1 discloses a configuration example of a robot hand encoder used for a robot hand including a movable part rotated with a motor, and capable of detecting a rotational state of the movable part. The robot hand encoder includes a disc part rotating as one unitary piece together with a rotational shaft of a motor, a first cover provided between the motor and the disc part, and a circuit board having a main surface provided with an optical sensor which transmits and receives light to detect a rotational state of the disc part to and from the disc part. The optical sensor is inserted into a through hole formed in part of a support part of the first cover. This structure enables the optical sensor to overlap the first cover in the rotational shaft direction of the motor, and reduces the thickness of the encoder by a thickness corresponding to the thickness of the optical sensor.

Patent Document 2 discloses a fastening tool for a frame member using a T slot.

Patent Document 3 discloses a separatable joint structure.

CITATION LIST

Patent Document

PATENT DOCUMENT 1: Japanese Unexamined Patent Publication No. 2015-127638
PATENT DOCUMENT 2: Japanese Unexamined Utility Model Publication No. H7-16007
PATENT DOCUMENT 3: Japanese Unexamined Patent Publication No. 2011-258793
PATENT DOCUMENT 4: Japanese Unexamined Patent Publication No. 2007-309352

SUMMARY OF THE INVENTION

Technical Problem

In the structure disclosed in Patent Document 1, the encoder is provided outside the movable part of the joint structure of the robot hand. For this reason, there is high possibility that the encoder malfunctions when external force, such as a shock, is applied from the outside of the joint structure. In particular, in the case of a care robot and/or an exoskeleton robot, it is expected that the human and/or environment frequently contacts the joint structure. Such a situation would further enhance the possibility of malfunction of the encoder disposed outside with respect to the bearing of the joint structure. This increases the trouble of maintenance, and is not preferable. In addition, unlike conventional industrial robots, in the case of care robots and exoskeletal robots, it is required to form robots themselves to be lightweight and compact to reduce the load on the users, and the stiffness cannot be increased in many cases. The link and the joint forming the robot are often formed of light metal, engineer link plastic resin, and/or fiber reinforced nylon, and the like, to reduce the weight. By intentionally reducing stiffness, it is supposed that the inside of the joint structure is greatly deformed. For example, the robot is deformed to secure safety, even when excessive load is applied. However, by contrast, securely obtaining information of the encoder is required to control the exoskeleton robot safely. These are conflicting technical problems.

In addition, in the structure disclosed in Patent Document 1, although the thickness of the encoder can be reduced, the size of the joint structure still increases in the axial direction by the encoder provided. Besides, a bearing component for the encoder is provided separately from the bearing of the joint structure, to receive stress applied onto the encoder. This structure increases the number of components and the number of assembly steps, and increases the weight of the joint structure. This structure causes difficulty in achieving the whole joint structure with a compact structure and light weight.

In addition, the joint structure of a robot requires a coupling structure enabling easy separation from and coupling with other members, such as the frame, and enabling fixing with positioning accuracy without causing unsteadiness of the coupled other members.

In the structure disclosed in Patent Document 3, although the joint structure can be separated from and coupled with a frame member, components such as positioning pins are required for accurate positioning. This structure increases the number of processing steps and assembly steps, and is not preferable.

In view of the foregoing problems, it is an object of the present invention to achieve a rotational structure used as, for example, a joint structure for a robot and including an encoder, the rotational structure preventing malfunction of the encoder due to external force, and having a compact and lightweight structure, with a small number of components. It is an object of the present invention to achieve a rotational structure enabling easy and secure separation from and coupling with another member with high accuracy.

Solution to the Problem

A first aspect of the present invention is a rotational structure comprising: a base member; a shaft member including one end fixed to the base member, and extending in an axial direction of the rotational structure; a rotational member attached to the shaft member through a bearing, and rotatable about the shaft member; and an encoder configured to detect a rotation angle of the rotational member, wherein a hollow portion, in which the base member is opposed to the rotational member, is formed around the shaft member inside the rotational structure, and the encoder includes: a detection target member provided around the shaft member in the hollow portion such that the detection target member is rotated together with one of the rotational member and the base member, and having a physical quantity changing in a circumferential direction; and a detector capable of detecting the physical quantity of the detection target element, and provided at a position in the hollow portion where the physical quantity of the detection target member is detectable, such that the detector is rotated together with the other of the rotational member and the base member.

With this structure, a hollow portion, in which the base member is opposed to the rotational member, is formed in a circumferential direction on the external circumferential side of the rotational axis inside the rotational structure. The encoder includes a detection target member having a physical quantity changing in a circumferential direction, and a detector capable of detecting the physical quantity of the detection target element. In the hollow portion, the detection target member is provided around the shaft member such that the detection target member is rotated together with one of the rotational member and the base member, and the detector is provided at a position where the physical quantity of the detection target member is detectable, such that the detector is rotated together with the other of the rotational member and the base member. This structure enables detection of the rotation angle of the rotational member from the output of the detector, because the detection target member or the detector is rotated about the shaft member with rotation of the rotational member. As described above, because the encoder can be provided in the hollow portion formed inside the rotational structure, the possibility of malfunction of the encoder is markedly low, even when external force, such as a shock, is applied from the outside of the rotational structure. In addition, this structure removes the necessity for a case protecting the encoder. Besides, because the encoder is provided inside the rotational structure, a compact rotational structure is achieved. In addition, the bearing for the encoder can also serve as the bearing of the rotational structure, and the casing function for the encoder is achieved with the components of the rotational structure. This structure enables reduction in number of components, and achieves reduction in number of assembly steps and reduction in weight.

A second aspect of the present invention is the rotational structure of the first aspect, further comprising an annular thrust bearing provided to surround the shaft member, between the base member and the rotational member, wherein the hollow portion is formed between an internal circumferential surface of the thrust bearing and an external circumferential surface of the shaft member.

With this structure, the encoder is provided in the hollow portion formed between an internal circumferential surface of the thrust bearing located between the base member and the rotational member, and an external circumferential surface of the shaft member. This structure removes the necessity for newly forming a hollow portion to provide the encoder therein, and securely enables the rotational structure with a compact structure.

A third aspect of the present invention is the rotational structure of the first or the second aspect, wherein the encoder is an optical encoder, the detection target member is a reflective scale provided with gradations such that light reflectance periodically changes in the circumferential direction, or a transmission scale provided with gradations such that light transmittance periodically changes in the circumferential direction, and the detector is a detection element applying light to the reflective scale or the transmission scale, receiving reflected light or transmitted light, and outputting an electrical signal corresponding to the reflected light or the transmitted light.

This structure enables the encoder to measure the rotation angle without using any transmission element, such as a belt and a gear, and accurately detect the rotation angle of the rotational member without occurrence of error caused by backlash.

A fourth aspect of the present invention is the rotational structure of the first or the second aspect, wherein the encoder is an optical encoder, the detection target member is a reflective scale provided with gradations such that light reflectance periodically changes in the circumferential direction, or a transmission scale provided with gradations such that light transmittance periodically changes in the circumferential direction, and the detector includes a light transmission optical fiber applying light to the reflective scale or the transmission scale, and a light reception optical fiber receiving reflected light or transmitted light.

This structure enables the encoder to measure the rotation angle without using any transmission element, such as a belt and a gear, and accurately detect the rotation angle of the rotational member without occurrence of error caused by backlash. In addition, the encoder can be formed only with an optical circuit without using an electronic circuit inside the rotational structure. This structure enables the encoder to function, even in the case where a strong magnetic field is generated and noise of the electronic circuit causes a problem when the rotational structure is used inside a functional magnetic resonance imaging (fMRI) scanner or the like, or in a situation in which the structure is used in the water or in an environment of high temperature and high humidity and no electronic circuit can be used.

A fifth aspect of the present invention is the rotational structure of the second aspect, wherein the detection target member and the detector are opposed to each other in the axial direction, and a space between the detection target member and the detector overlaps a range in which the thrust bearing is provided, in the axial direction.

With this structure, when a predetermined width is required for the detection target member and the detector, at least part of the width in which the thrust bearing is disposed is shared in the axial direction. This structure enables shortening of the shaft member in the axial direction, and formation of the rotational structure with a compact structure.

A sixth aspect of the present invention is the rotational structure of the second aspect, wherein the thrust bearing is a shielded bearing or a sealed bearing.

This structure enables prevention of alien substances from entering the encoder, even in use in an environment with much dust, and reduces influence of dust and the like.

A seventh aspect of the present invention is the rotational structure of the first aspect, wherein the hollow portion is sealed with respect to outside of the rotational structure.

This structure enables the encoder to function even in the water, an environment of high temperature and high humidity, or an environment under high pressure.

An eighth aspect of the present invention is the rotational structure of the first aspect, wherein the encoder is an optical encoder, and the hollow portion is shielded from light such that no light enters from outside of the rotational structure.

This structure enables prevention of noise due to light from outside, in detection of the rotation angle with the encoder.

A ninth aspect of the present invention is the rotational structure of any one of the first to the eighth aspects, wherein the shaft member has a hollow structure pierced in the axial direction.

This structure enables a structure in which the wire extends through the hollow structure of the shaft member, that is, wiring through the shaft.

A tenth aspect of the present invention is the rotational structure of any one of the first to the ninth aspects, wherein at least one of the base member and the rotational member is provided with a coupling surface serving as a plane to couple a different member, in an external circumferential surface thereof in a circumferential direction of the shaft member, and the coupling surface is provided with a groove portion having a cross section with an inverted T shape.

With this structure, the coupling surface of the base member or the rotational member is provided with a groove portion having a cross section with an inverted T shape. This structure enables easy coupling of a different member with the rotational structure using the groove portion, by a wedge coupling method using the T-shaped wedge member.

An eleventh aspect of the present invention is the rotational structure of the tenth aspect, wherein the different member is coupled with the coupling surface using a T-shaped wedge member including a head portion with a projection and a trunk portion provided with a through hole, the head portion of the wedge member is inserted into the groove portion in coupling, the trunk portion is inserted into a hole formed in an end surface of the different member, and the wedge member is fixed to the different member with a screw extending through the through hole and including a tapered portion, and at least one of the base member and the rotational member is provided with a projection portion on a surface of the coupling surface, the projection portion abutting against a side surface of the different member in coupling.

With this structure, when a different member is coupled with the rotational structure, the projection portion formed in the surface of the coupling surface abuts against the side surface of the different member. This structure prevents unsteadiness of the coupled different member, and enables accurate positioning of the rotational member and the different member.

A twelfth aspect of the present invention is a rotational structure comprising: a base member; a shaft member including one end fixed to the base member, and extending in an axial direction of the rotational structure; a rotational member attached to the shaft member through a bearing, and rotatable about the shaft member; an annular cross roller bearing provided to surround the shaft member, and including an internal circumferential surface against which the rotational member abuts, and an external circumferential surface against which the base member abuts, and an encoder configured to detect a rotation angle of the rotational member, wherein a hollow portion, in which the base member is opposed to the rotational member, is formed around the shaft member inside the rotational structure, and the encoder includes: a detection target member provided around the shaft member in the hollow portion such that the detection target member is rotated together with one of the rotational member and the base member, and having a physical quantity changing in a circumferential direction; and a detector capable of detecting the physical quantity of the detection target element, and provided at a position in the hollow portion where the physical quantity of the detection target member is detectable, such that the detector is rotated together with the other of the rotational member and the base member.

With this structure, a hollow portion, in which the base member is opposed to the rotational member, is formed around the rotational axis inside the rotational structure. The encoder includes a detection target member having a physical quantity changing in a circumferential direction, and a detector capable of detecting the physical quantity of the detection target element. In the hollow portion, the detection target member is provided around the shaft member such that the detection target member is rotated together with one of the rotational member and the base member, and the detector is provided at a position where the physical quantity of the detection target member is detectable, such that the detector is rotated together with the other of the rotational member and the base member. This structure enables detection of the rotation angle of the rotational member from the output of the detector, because the detection target member or the detector is rotated about the shaft member with rotation of the rotational member. As described above, because the encoder can be provided in the hollow portion formed inside the rotational structure, the possibility of malfunction of the encoder is markedly low, even when external force, such as a shock, is applied from the outside of the rotational structure. In addition, this structure removes the necessity for a case protecting the encoder. Besides, because the encoder is provided inside the rotational structure, a compact rotational structure is achieved. In addition, using a cross roller bearing capable of receiving radial load in addition to thrust load reduces the number of components, and enables a more compact rotational structure. In addition, the cross roller bearing is configured such that the rotational member abuts against the internal circumferential surface of the cross roller bearing and the base member abuts against the external circumferential surface of the cross roller bearing. This structure enables use of a cross roller bearing with a larger diameter. In addition, this structure increases the resolution for the rotation angle, because the encoder can be disposed on a more external circumferential side.

A thirteenth aspect of the present invention is a rotational structure comprising: a base member; a shaft member including one end fixed to the base member, and extending in an axial direction of the rotational structure; and a rotational member attached to the shaft member through a bearing, and rotatable about the shaft member; wherein at least one of the base member and the rotational member is provided with a coupling surface serving as a plane to couple a different member, in an external circumferential surface thereof in a circumferential direction of the shaft member, the coupling surface is provided with a groove portion having a cross section with an inverted T shape, the different member is coupled with the coupling surface using a T-shaped wedge member including a head portion with a projection and a handle portion provided with a through hole, the head portion of the wedge member is inserted into the groove portion in coupling, the handle portion is inserted into a hole formed in an end surface of the different member, and the wedge member is fixed to the different member with a screw extending through the through hole and including a tapered portion, and at least one of the base member and the rotational member is provided with a projection portion on a surface of the coupling surface, the projection portion abutting against a side surface of the different member in coupling.

With this structure, a groove portion having a cross section with an inverted T shape is formed in the coupling surface of the base member or the rotational member. This structure enables easy coupling of a different member with the rotational structure using the groove portion, by a wedge coupling method using the T-shaped wedge member. In addition, when the different member is coupled with the rotational structure, the projection portion formed in the surface of the coupling surface abuts against the side surface of the different member. This structure prevents unsteadiness of the coupled different member.

A fourteenth aspect of the present invention is an assist system comprising: a base; a rotational structure including a base member, a shaft member including one end fixed to the base member, a rotational member attached to the shaft member through a bearing and rotatable about the shaft member, and an encoder configured to detect a rotation angle of the rotational member, the base member being coupled with the base; a support member configured to support an arm of a user, and including a frame coupled with the rotational member; a pneumatic cylinder provided to enable adjustment of a position of the support member with respect to the base, in accordance with supplied pneumatic pressure;

and a controller configured to control pneumatic pressure of the pneumatic cylinder on the basis of the rotation angle detected by the encoder of the rotational structure.

With this structure, the base member of the rotational structure is coupled with the base. In addition, the support member to support the arm of the user includes a frame coupled with the rotational member of the rotational structure. The pneumatic cylinder adjusts the position of the support member with respect to the base, in accordance with the supplied pneumatic pressure. The controller controls pneumatic pressure of the pneumatic cylinder, on the basis of the rotation angle detected by the encoder of the rotational structure. This structure enables the support member to move to a desired angle with respect to the base, by control of the controller.

A fifteenth aspect of the present invention is the assist system of the fourteenth aspect, wherein the rotational structure is the rotational structure of any one of the first to the twelfth aspects.

This structure markedly reduces the possibility that the encoder malfunctions due to external force with respect to the rotational structure, and enables the rotational structure to have a compact structure.

A sixteenth aspect of the present invention is a robot comprising the rotational structure of any one of the first to the thirteenth aspects, the rotational structure serving as a joint structure.

Advantages of the Invention

The present invention achieves a rotational structure including an encoder, preventing malfunction of the encoder due to external force and reading failure, and having a compact structure, with a small number of components. The present invention also enables easy and secure coupling of the rotational structure with another member with high stiffness and high accuracy.

DESCRIPTION OF EMBODIMENTS

The following is a detailed explanation of an embodiment of the present invention with reference to the drawings.

Figure 1A:
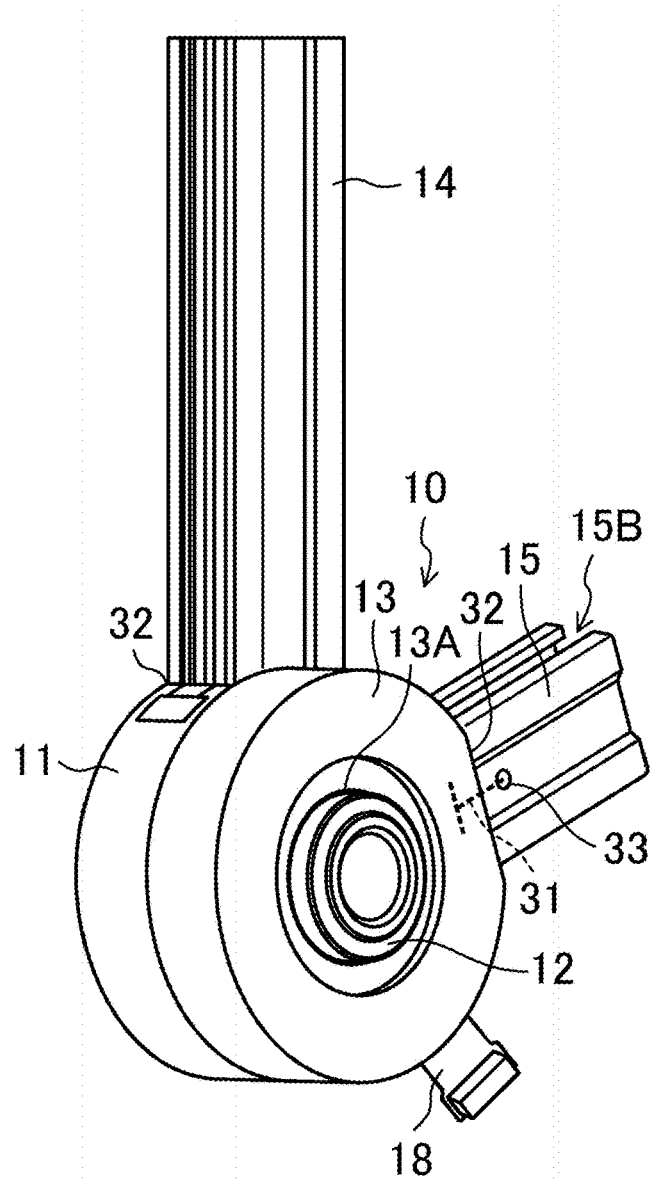
FIG. 1A is a schematic external view of a rotational structure.

FIG. 1A is a schematic external view of a rotational structure 10 according to an embodiment. The rotational structure explained in the present embodiment is used as, for example, a joint structure of a robot. The rotational structure may be used for use other than robots. The rotational structure 10 includes a base member 11, a shaft member 12 fixed at one end to the base member 11 and extending in an axial direction of the rotational structure 10, and a rotational member 13 provided with a hole 13A through which the shaft member 12 extends, and attached to the shaft 12 via a bearing. The rotational member 13 is rotatable about the shaft member 12. Herein, the shaft member 12 has a hollow structure pierced in an axial direction. The rotational structure 10 includes an encoder, embedded therein, which detects a rotation angle of the rotational member 13, as described later. A circuit board 18 outputs a detection signal of the encoder from the rotational structure 10. The circuit board 18 may be a flexible printed circuit (FPC).

A frame 14 is coupled with the base member 11, and a frame 15 is coupled with the rotational member 13. The frames 14 and 15 serve as, for example, arms of the robot. Herein, the frames 14 and 15 are coupled with the base member 11 and the rotational member 13, respectively, by a wedge coupling method described later. The details of the wedge coupling method will be described later. The rotational structure 10 may be used in a manner in which the base member 11 is fixed and the rotational member 13 is rotated, or in a manner in which the rotational member 13 is fixed and the base member 11 and the shaft member 12 are rotated.

Figure 2:
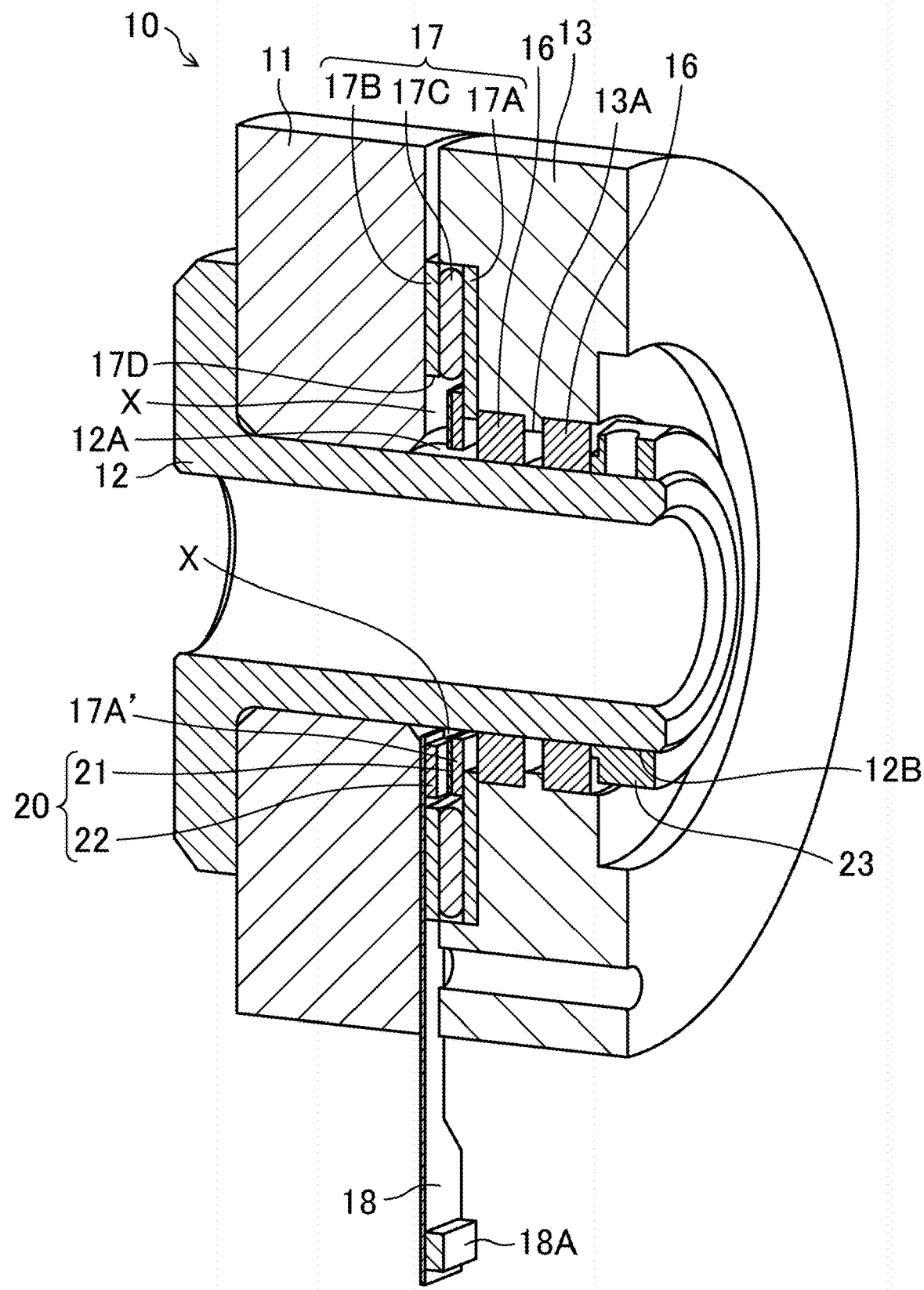
FIG. 2 is a schematic cross-sectional perspective view of the rotational structure of FIG. 1A.

FIG. 2 is a schematic cross-sectional perspective view of the rotational structure 10 of FIG. 1A. The base member 11 is fixed to the shaft member 12 with a screw or the like. The base member 11 and the shaft member 12 may be a united component. The shaft member 12 has a hollow structure, and is pierced in the axial direction. The rotational member 13 is attached to the shaft member 12, with a bearing 16 interposed therebetween. Specifically, the shaft member 12 is inserted through the hole 13A of the rotational member 13, and the annular bearing 16 is provided between an external circumferential surface 12A of the shaft member 12 and an internal circumferential surface of the hole 13A. An annular thrust bearing 17 is provided between the base member 11 and the rotational member 13. The thrust bearing 17 is formed of a housing bearing washer 17A, a shaft bearing washer 17B, and a rolling bearing 17C. The thrust bearing 17 is provided on a surface of the base member 11 on a side facing the rotational member 13, and the housing bearing washer 17A abuts against a surface of the rotational member 13 facing the base member 11. When the rotational member 13 is rotated about the shaft member 12, the housing bearing washer 17A slides on the rolling bearing 17C.

A hollow portion X is formed between an internal circumferential surface 17D of the annular thrust bearing 17 and the external circumferential surface 12A of the shaft member 12. In the hollow portion X, the base member 11 is opposed to the rotational member 13. The hollow portion X is formed around the shaft member 12, and has an annular shape in this example. The hollow portion X is provided with an encoder 20 detecting a rotation angle of the rotational member 13.

The encoder 20 is an optical-reflection encoder in this example. The encoder 20 includes a reflective scale 21 serving as an example of a detection target member, and a detection element 22 serving as an example of a detector. The reflective scale 21 has an annular shape, and is fixed to a surface of a member 17A' formed as one unitary piece with the housing bearing washer 17A forming the thrust bearing 17, in the hollow portion X. The reflective scale 21 is provided on the rotational member 13, concentrically with the shaft member 12. In the hollow portion X, the detection element 22 is disposed in a position opposed to part of the reflective scale 21 on the surface of the base member 11. Gradations are formed on the surface of the reflective scale 21 such that light reflectance periodically changes in the circumferential direction. The detection element 22 projects light, receives reflected light in the reflective scale 21, and transmits an electrical signal corresponding to the reflected light. The circuit board 18 is disposed on the base member 11, and a connector 18A to take out an electrical signal is provided on the circuit board 18. A male screw portion 12B is provided at a distal end of the shaft member 12, and a nut 23 holds the rotational structure 10.

Figure 3:
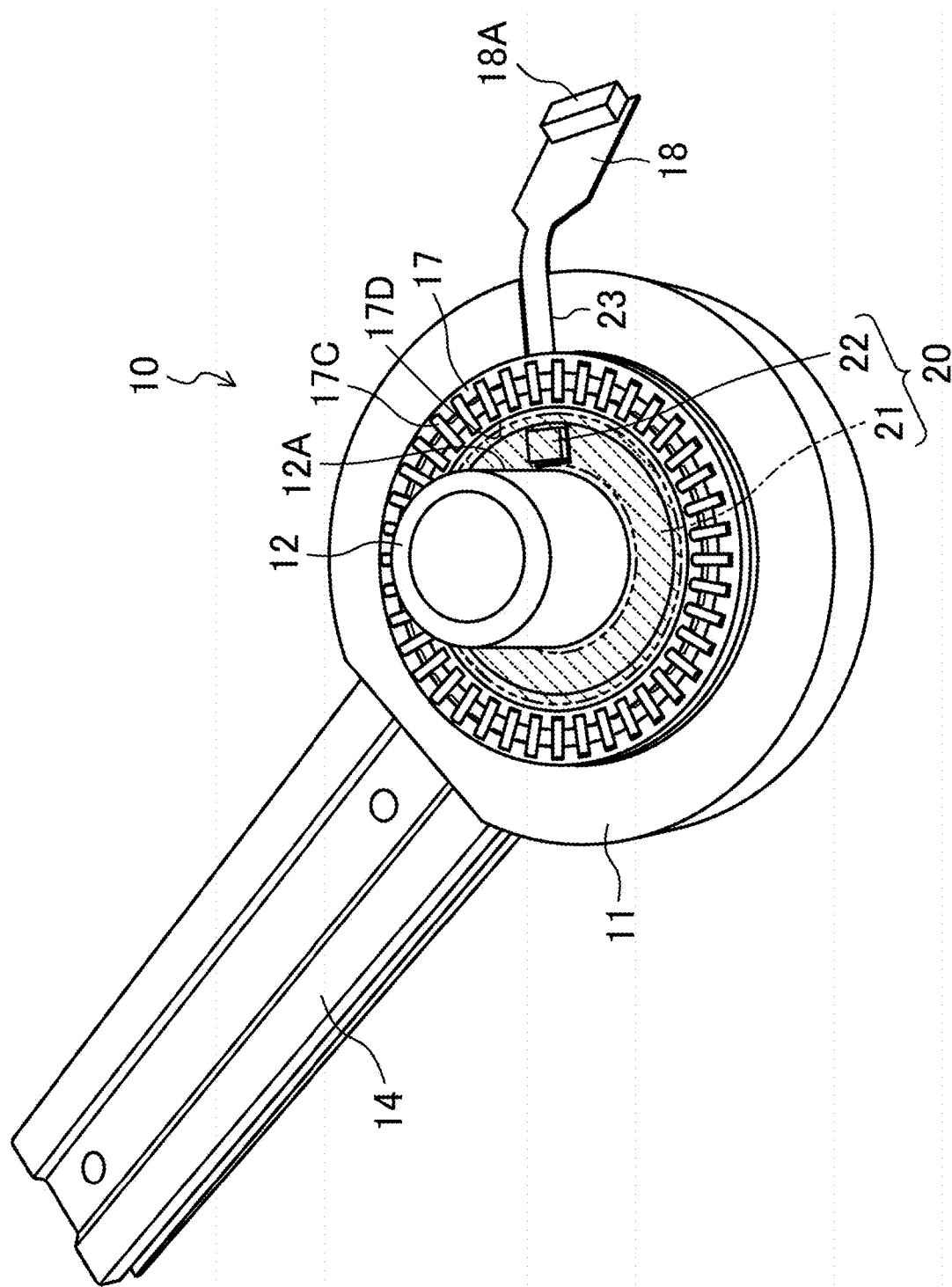
FIG. 3 is a diagram illustrating an exploded state of the rotational structure of FIG. 1A.

FIG. 3 is a diagram illustrating a state in which the rotational structure 10 is exploded. FIG. 3 illustrates a state in which the rotational member 13 is removed, to clearly illustrate the structure of the encoder 20. Broken lines illustrate the position in which the reflective scale 21 is disposed. The detection element 22 is provided between the internal circumferential surface 17D of the thrust bearing 17 and the external circumferential surface 12A of the shaft member 12, and in a direction to project light toward the rotational member 13. Wires 23 of the detection element 22 run under the thrust bearing 17, and are connected with the circuit board 18. The detection element 22 and the wires 23 may be positioned by forming, for example, attaching grooves in the base member 11. The positioning of the reflective scale 21 may be performed using, for example, a positioning pin.

With this structure, the annular hollow portion X in which the base member 11 is opposed to the rotational member 13 is formed in the circumferential direction on the external circumferential side of the shaft member 12 inside the rotational structure 10. The encoder 20 includes the annular reflective scale 21 and the detection element 22. In the hollow portion X, the reflective scale 21 is provided on the rotational member 13 concentrically with the shaft member 12, and the detection element 22 is disposed in a position opposed to part of the reflective scale 21 on the base member 11. Because the reflective scale 21 provided on the rotational member 13 is rotated about the shaft member 12 with rotation of the rotational member 13, it is possible to detect the rotation angle of the rotational member 13 from the detection signal of the detection element 22. As described above, the encoder 20 is provided in the hollow portion X formed inside the rotational structure 10. This structure enables prevention of contact with the external object without using a case. In addition, even when external force, such as a shock, is applied from the outside of the rotational structure 10, the possibility that the encoder 20 malfunctions is markedly low. The thrust bearing 17 forming the rotational structure is used as a component fixing the encoder 20. This structure enables reduction in number of components and number of steps of assembly. Besides, because the encoder 20 is provided inside the rotational structure 10, the rotational structure 10 with a compact structure can be achieved. Specifically, with respect to the rotational structure 10 including the encoder 20, it is possible to markedly reduce the possibility of malfunction of the encoder 20 due to external force, reduce the number of components and the number of steps of assembly, and achieve a compact structure.

In addition, with the structure described above, the encoder 20 is provided in the vicinity of the bearing 16, between two surfaces lubricated with the thrust bearing 17 inside the rotational structure 10. For this reason, even when the base member 11 is distorted with respect to e.g., the shaft member 12 due to, for example, external force, the measurement error of the rotation angle is reduced in comparison with the case where the encoder is provided outside the rotational structure. Besides, the scale 21 and the detection element 22 are adjacent to the shaft bearing washer 17B and the housing bearing washer 17A. The opposed distance between the scale 21 and the detection element 22 hardly changes, even when external force is applied to the base member 11 and the rotational member 13 and the thrust bearing 17 receives stress. This structure enables stable detection of the rotation angle of the rotational member 13 with respect to the shaft member 12, even in a situation in which external force is applied. Specifically, the structure of the present embodiment also produces the effect of increase in accuracy of measurement of the rotation angle.

In addition, in the structure described above, the scale 21 and the detection element 22 are opposed in the axial direction, and a space between the scale 21 and the detection element 22 in the axial direction overlaps a range in which the thrust bearing 17 is provided. In this manner, when a predetermined width is required for the scale 21 and the detection element 22, at least part of the width in which the thrust bearing 17 is disposed is shared in the axial direction. This structure enables shortening of the shaft member 12 in the axial direction, and formation of the rotational structure 1 with a compact structure.

In the structure described above, the encoder 20 is provided in the hollow portion X formed between the internal circumferential surface 17D of the thrust bearing 17 between the base member 11 and the rotational member 13, and the external circumferential surface 12A of the shaft member 12. This structure removes the necessity for newly forming a hollow portion to provide the encoder 20 therein, and securely enables the rotational structure 10 to be formed with a compact structure.

In the structure described above, an optical encoder is used as the encoder 20. The scale 21 is provided to be rotated together with the rotational member 13. The detection element 22 is provided to be rotated together with the base member 11 and the shaft member 12. This structure prevents an error due to backlash and/or slipping, in comparison with the method of measuring rotation with an external encoder through transmission components, such as a belt, a gear, and a coupling, and enables accurate detection of the rotation angle of the rotational member 13 with respect to the shaft member 12.

In the structure described above, the shaft member 12 of the rotational structure 10 including the encoder 20 therein can be provided with a hollow structure. This structure enables a structure in which the wire extends through the hollow structure of the shaft member 12, that is, wiring through the shaft. As a matter of course, a shaft member with no hollow structure may be used.

In the structure described above, the encoder 20 has a structure in which the reflective scale 21 is provided on the rotational member 13 side, and the detection element 22 is provided on the base member 11 side, but the positions of the reflective scale 21 and the detection element 22 may be changed. Specifically, the reflective scale 21 may be provided on the base member 11 side, and the detection element 22 is provided on the rotational member 13 side. In this case, because the circuit board 18 is provided on the rotational member 13 side, the wires of the encoder 20 can be taken out on the rotational member 13 side.

In the structure described above, the encoder 20 is an optical reflection encoder, but the structure is not limited thereto. For example, the encoder 20 may be an optical transmission encoder. In this case, a transmission scale with light reflectance periodically changing in the circumferential direction may be used as an example of the detection target member, and the detection element including a light emitter and a light receiver may be disposed such that light radiated from one surface of the transmission scale is received at the other surface. As another example, the encoder may be a magnetic encoder or an electric-resistance type encoder. For example, a magnetic encoder may be formed of a scale with magnetic force changing in the circumferential direction, and a detection element detecting magnetic force, such as a Hall element. For example, a magnetic encoder (model number: AEAT-6600-T16, etc.) manufactured by AVAGO Technologies may be used as the magnetic encoder. As another example, a resolver (such as a resolver manufactured by TAMAGAWA SEIKI Co., Ltd.: Synglsyn (registered trademark) and the like) may be used as the magnetic encoder. Specifically, the detection target member included in the encoder may be any target having a physical quantity changing in the circumferential direction, and the detection element may be any element capable of detecting a physical quantity of the detection target member.

In the structure described above, the scale 21 and the detection element 22 forming the encoder 20 are opposed on the thrust surface in the hollow portion X. As another example, it is possible to adopt a structure in which the scale 21 and the detection element 22 are opposed on the external circumferential surface 12A of the shaft member 12 and the internal circumferential surface 17D of the thrust bearing 17.

In addition, the hollow portion X may be any hollow portion as long as it secures a space in which the scale 21 and the detection element 22 forming the encoder 20 are opposed. For example, the hollow portion X may be a space serving as a part of an annular shape. Specifically, the hollow portion X may have a fan shape.

In one preferred embodiment, when the encoder 20 is an optical encoder, the hollow portion X is shielded or sealed to prevent light or dust from entering from outside of the rotational structure 10. For example, in the structure of FIG. 2, use of a shielded bearing as the thrust bearing 17 enables prevention of alien substances from entering the encoder 20, even in use in an environment with much dust, and reduces influence of dust and the like. In addition, when sealed bearings are used for the bearing 16 and the thrust bearing 17, a space between the circuit board 18 and the thrust bearing 17 is sealed, and a space between the base member 11 and the shaft member 12 is sealed, the hollow portion X has a structure sealed with respect to the outside. This structure enables the encoder 20 to function even in the water, in an environment of high temperature and high humidity, or an environment under high pressure, in addition to the effect of reducing influence of dust and the like. Patent Document 4, for example, discloses a sealed thrust bearing.

In addition, when lubricant oil is used for the bearing 16 or the thrust bearing 17, using a shielded bearing or a sealed bearing avoids the problem that the encoder 20 does not function due to adhesion of lubricant oil inside the bearing to the reflective scale 21 or the detection element 22. In the case where the encoder is a magnetic encoder or an electric induction encoder, this structure also reduces influence of magnetic substance powder generated inside the bearing on the electromagnetic circuit. In addition, the hollow portion X is shielded from light with the rotational structure 10 itself. This structure prevents noise due to light from the outside, in detection of the rotation angle with the encoder 20. In addition, use of a shielded bearing or a sealed bearing achieves a higher light shield rate in comparison with an open bearing.

In the case of a reflective or transmission optical encoder, it is possible to dispose the circuit board, the detection element, and the wires outside the rotational structure, and dispose optical fibers inside the rotational structure, to perform light projection and light reception on the scale. In this case, it is possible to remove metal from the constituent elements of the encoder included in the rotational structure. This structure enables formation of the whole rotational structure 10 without using metal, by using the base member 11, a resin bearing, and a bush as bearing components. In addition, formation with a nonmagnetic material enables sensing of angle information of the rotational structure 10, even in a strong magnetic field, such as a functional magnetic resonance imaging (fMRI) device.

Figure 4:
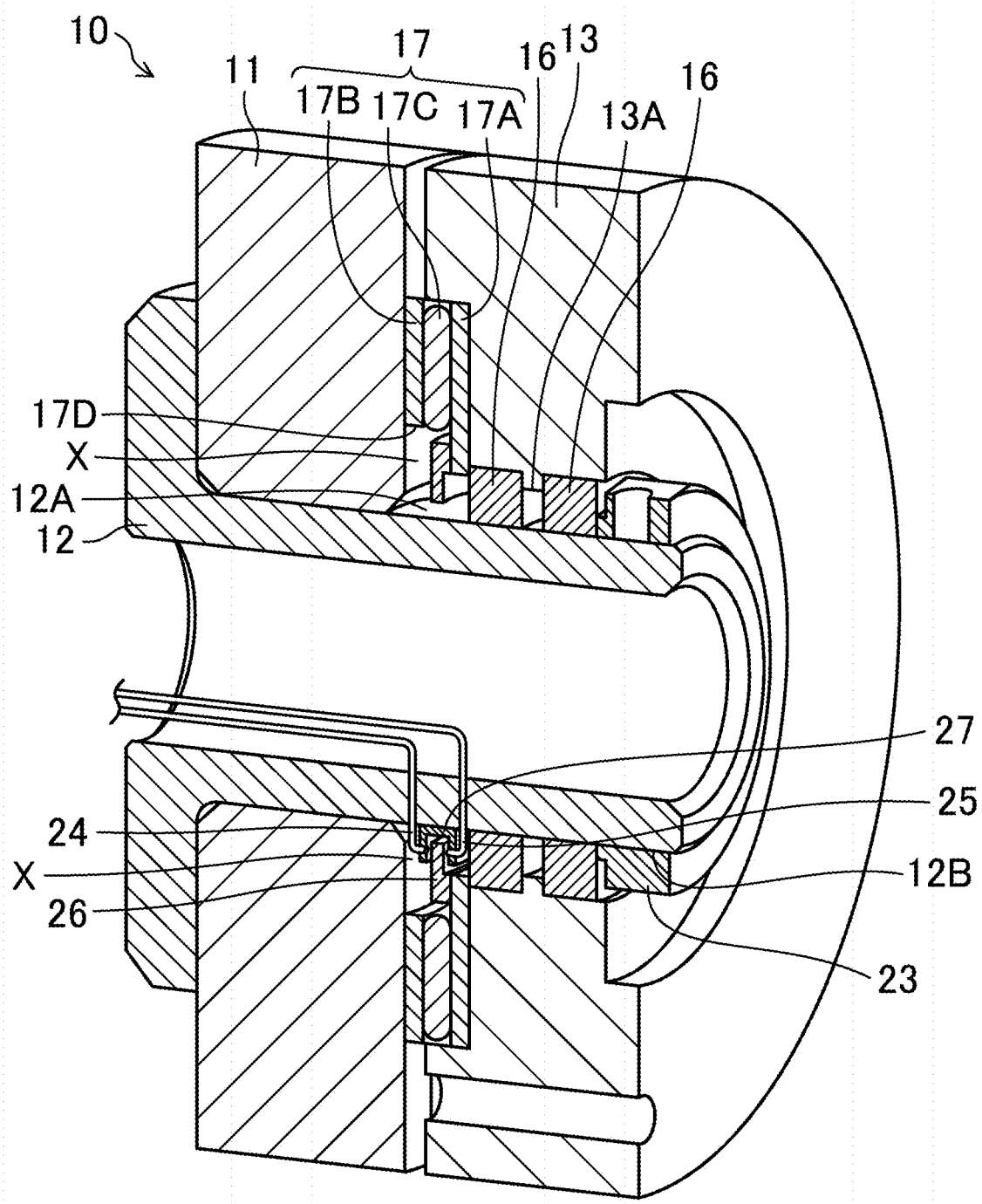
FIG. 4 is a schematic cross-sectional perspective view illustrating another example of the rotational structure.

FIG. 4 is a schematic cross-sectional view of a rotational structure using a transmission optical encoder and optical fibers. Constituent elements similar to those in FIG. 2 are denoted by the same reference numerals as those in FIG. 2, and a detailed explanation thereof is omitted. In the structure of FIG. 4, a slit 26 serving as a transmission scale is formed as one unitary piece with the housing bearing washer 17A included in the thrust bearing 17. In addition, a light transmission optical fiber 24 is provided on the base member 11 side of the slit 26, and a light reception optical fiber 25 is provided on the rotational member 13 side of the slit 26. The light transmission optical fiber 24 and the light reception optical fiber 25 are supported with a support member 27 fixed on an external circumferential surface of the shaft member 12. Specifically, in the structure of FIG. 4, the detection unit includes the light transmission optical fiber 24 applying light to the transmission scale serving as an example of the detection target member, and the light reception optical fiber 25 receiving transmitted light. The light transmission optical fiber 24 may be provided on the rotational member 13 side of the slit 26, and the light reception optical fiber 25 may be provided on the base member 11 side of the slit 26. In the case of using a reflective scale as the detection target member, the detection unit includes a light transmission optical fiber applying light to the reflective scale, and a light reception optical fiber receiving reflected light.

Signal transmission and reception of the detection element 22 may be performed using a wireless module. In this case, no wires 23 are required.

In the structure described above, the encoder 20 is provided in the hollow portion X formed between the internal circumferential surface 17D of the thrust bearing 17 and the external circumferential surface 12A of the shaft member 12, but the structure is not limited thereto. Specifically, like the structure as described above, the encoder may be provided in any hollow portion in which the base member is opposed to the rotational member inside the rotational structure. For example, another hollow portion to provide the encoder 20 therein may be formed separately.

In the structure described above, the planar shape (shape as viewed in the axial direction) of the rotational structure 10 is substantially circular, but the planar shape of the rotational structure is not limited thereto. For example, the planar shape of the rotational structure may be a polygonal shape, such as a hexagonal shape, or an oval shape.

Wedge Coupling Method

The following is an explanation of a coupling structure of the rotational structure 10 and the frames 14 and 15. The coupling structure explained hereinafter is also applicable to rotational structures other than the rotational structure 10 described above.

Figure 1B:
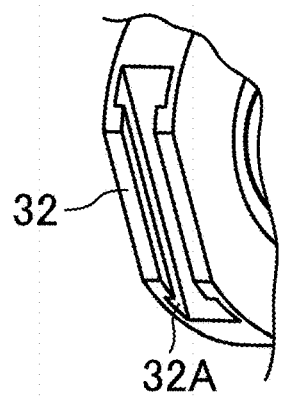
FIG. 1B is a structural drawing of a coupling surface.

With reference to FIG. 1A again, the rotational structure 13 and the frame 15 are coupled with each other with a T-shaped wedge member 31 (illustrated with bold broken lines). As illustrated in FIG. 1B, a coupling surface 32 serving as a plane to couple the frame 15 is formed in the external circumferential surface of the rotational member 13 in the circumferential direction of the shaft member 12, and the coupling surface 32 is provided with a groove portion 32A extending in a direction perpendicular to the axial direction. The cross-sectional shape of the groove portion 32A is an inverted T shape. A screw 33 has a function of fixing the wedge member 31 to the frame 15, and pulling the wedge member 31 toward the frame 15 by insertion of the screw into the frame 15.

Figure 5A:
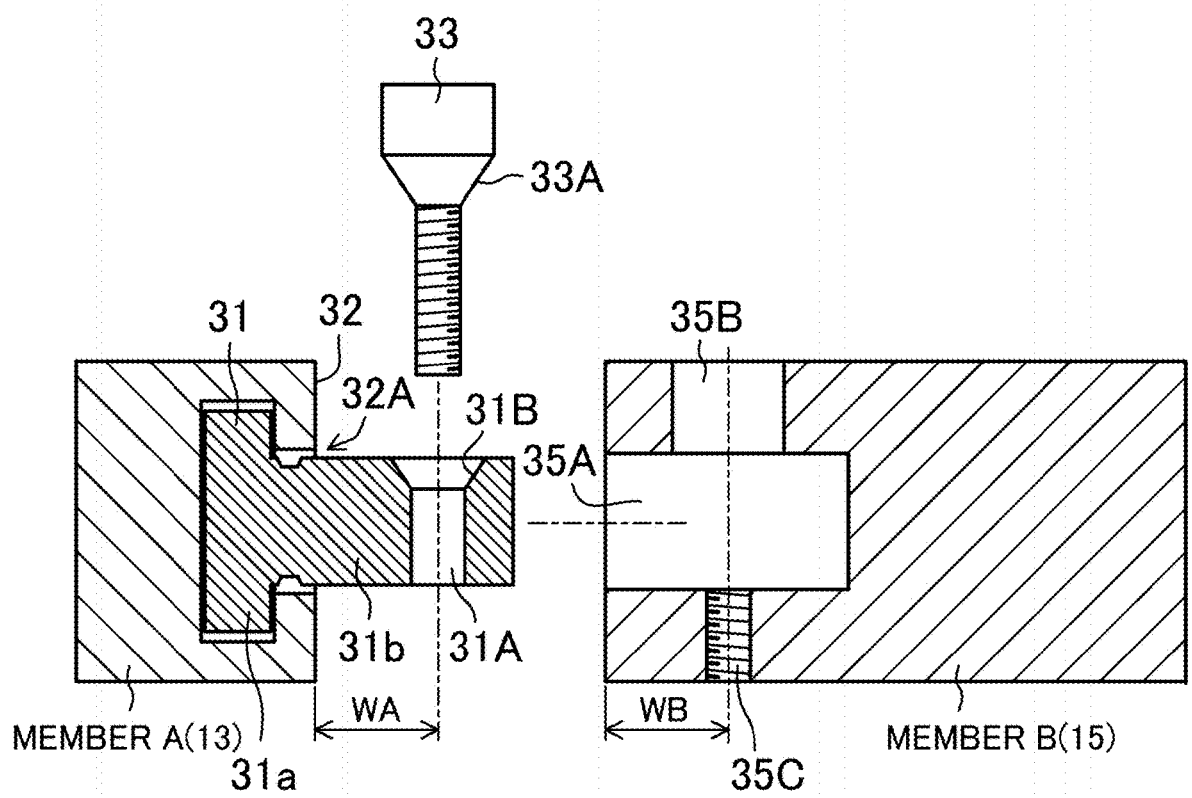
FIG. 5A is a schematic cross-sectional view illustrating details of a wedge coupling method.
Figure 5B:
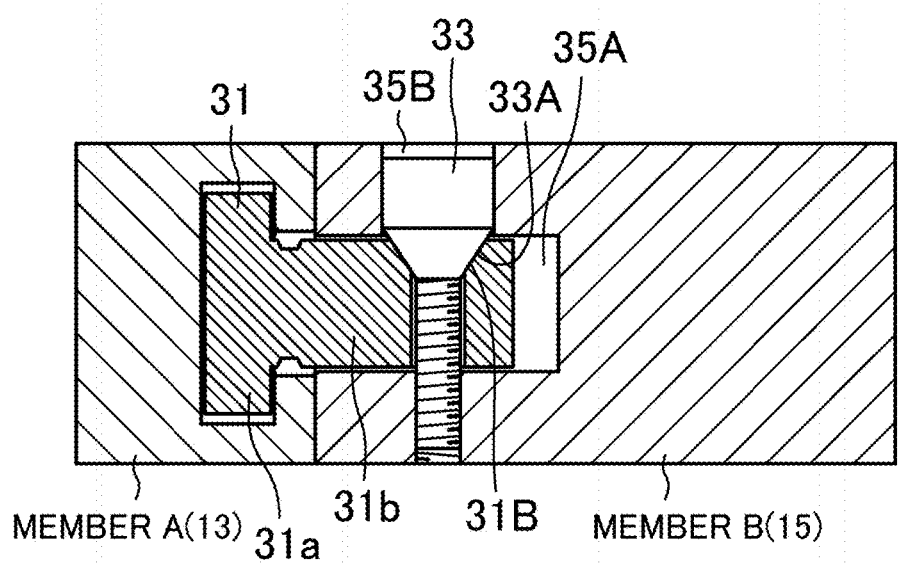
FIG. 5B is a schematic cross-sectional view illustrating details of the wedge coupling method.

FIG. 5A and FIG. 5B are schematic cross-sectional views illustrating details of the wedge connection method. In FIG. 5A and FIG. 5B, the T-shaped wedge member 31 is used to couple the member A with the member B. For example, in FIG. 1A, the rotational member 13 corresponds to the member A, and the frame 15 serving as an example of another member corresponds to the member B. The wedge member 31 includes a head portion 31a including a projection, and a trunk portion 31b. The coupling surface 32 of the member A is provided with the groove portion 32A having a cross section with an inverted T shape. The head portion 31a of the wedge member 31 is inserted into the groove 32A. The trunk portion 31b of the wedge member 31 is provided with a through hole 31A extending in a direction perpendicular to the axial direction of the wedge member 31. The member B is provided with a hole 35A into which the wedge member 31 is to be inserted. The member B is also provided with holes 35B and 35C communicating with the hole 35A and extending in a direction perpendicular to a direction into which the wedge member 31 is inserted. The screw 33 is inserted into the holes 35B and 35C. For example, the hole 35C is provided with a thread engaged with the screw 33.

As illustrated in FIG. 5B, the wedge member 31 with the head portion 31a inserted into the groove portion 32A of the member A s inserted into the hole 35A of the member B, and the screw 33 is inserted into the hole 35B of the member B. A tapered portion 33A of the screw 33 abuts against a tapered internal circumferential surface 31B of the hole 31A of the wedge member 31 on the member B side, and the wedge member 31 is pulled toward the member B by fastening the screw 33. In this manner, the member A and the member B are pushed against each other by strong force, and the member A and the member B are coupled and fixed. In this state, a distance WA between the coupling surface 32 of the member A and the center line of the hole 31A is set slightly shorter than a distance WB between the surface of the member B abutting against the coupling surface 32 and the center line of the hole 35C.

Specifically, the member B is coupled with the coupling surface 32 using the T-shaped wedge member 31 including the head portion 31a including a projection and the trunk portion 31b provided with the through hole 31A. In coupling, the head portion 31a of the wedge member 31 is inserted into the groove portion 32A; the trunk portion 31b is inserted into the hole 35A formed in the end surface of the member B; and the wedge member 31a is fixed to the member B with the screw 33 extending through the through hole 31A and including the tapered portion 33A. The coupling structure as described above enables easy coupling of the rotational structure 10 with the frames 14 and 15. In addition, the coupling structure enables easy coupling of a plurality of rotational structures 10.

Figure 6:
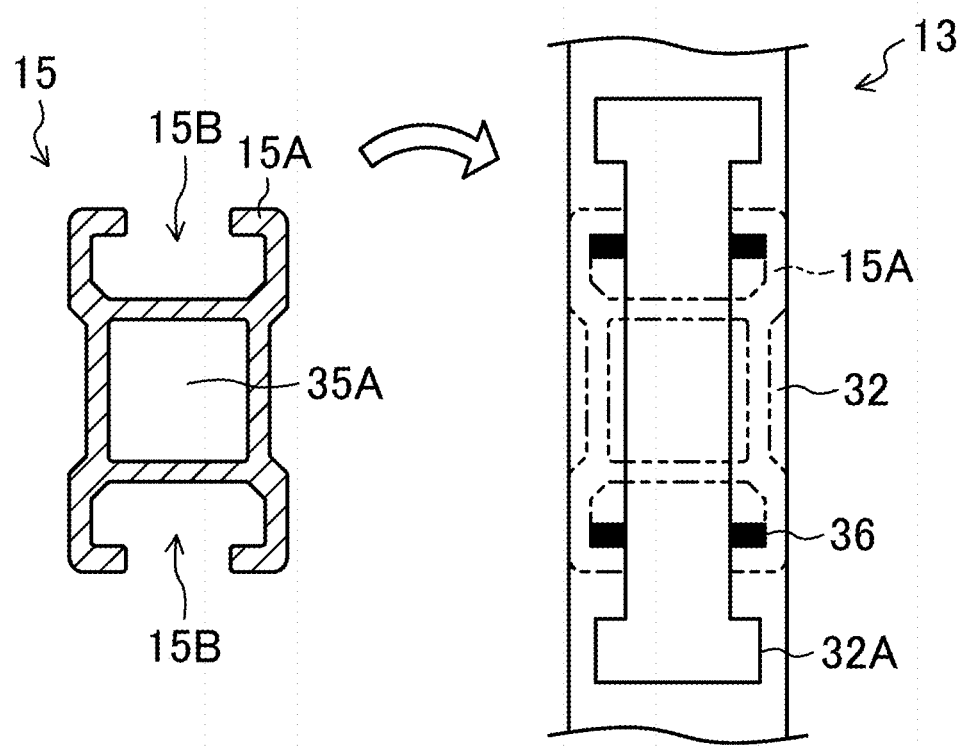
FIG. 6 is a diagram illustrating a coupling state of a frame end surface and a rotational member.

FIG. 6 is a diagram illustrating a shape of an end surface 15A of the frame 15, and a state in which the end surface 15A is coupled with the rotational member 13. In the end surface 15A of the frame 15, a hole 35A into which the wedge member 31 is to be inserted is opened. A projection portion 36 is formed in the surface of the coupling surface 32 of the rotational member 32. In FIG. 6, the projection portion 36 is formed of four projections having a rectangular planar shape. The projection portion 36 is configured to abut against the side surface of the frame 15, when the frame 15 is coupled with the rotational member 13. This structure prevents unsteadiness when the frame 15 is coupled with the rotational member 13.

The end surface shape of the frame 15 illustrated in FIG. 6 is a mere example, and may be another end surface shape. In addition, FIG. 6 illustrates that the projection portion 36 is formed of four projections having a rectangular planar shape, but the shape and the number of the projection portion formed in the surface of the coupling surface 32 are not limited thereto. Specifically, the projection portion may have any form, as long as the projection portion abuts against the side surface of the frame in coupling. In addition, the wedge coupling method explained herein may be applied to rotational structures other than the rotational structure including the encoder structure explained above, as a matter of course.

As illustrated in FIG. 1A and FIG. 6, the side surface of the frame 15 is also provided with groove portions 15B each having a cross-section with an inverted T shape. Other members can be easily coupled with the frame 15 using the groove portions 15B and the wedge coupling method described above. In addition, the coupling positions of other members with respect to the frame 15 can easily be adjusted, by adjusting the positions of the wedge members in the longitudinal direction of the groove portions 15B.

Example of Use of Rotational Structure

The following is an explanation of an example of the system configuration using the rotational structure described above.

EXAMPLE 1

Shoulder Assist System

Figure 7:
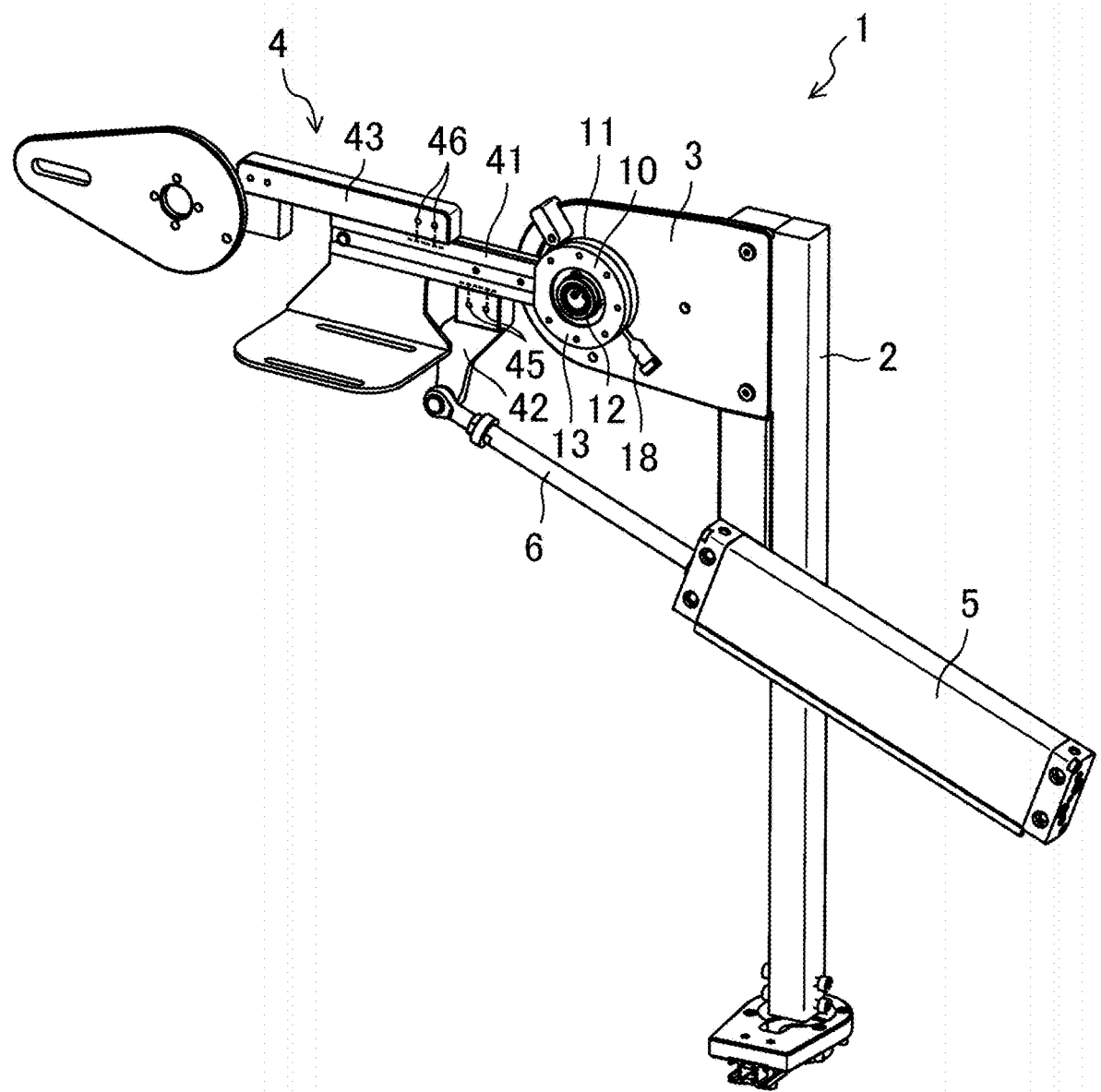
FIG. 7 is a perspective view illustrating a configuration example of a shoulder assist system.

FIG. 7 is a perspective view illustrating a configuration example of a shoulder assist system. A shoulder assist system 1 in FIG. 7 includes the rotational structure 10 described above. The shoulder system 1 serving as an example of the assist system includes a support column 2, a plate 3 fixed to the support column, and a support member 4 to support the arm of the user. The support column 2 and the plate 3 correspond to the base in the assist system. The rotational structure 10 described above is fixed to the plate 3. The base member 11 of the rotational structure 10 is coupled with the plate 3, and a frame 41 included in the support member 4 is coupled with the rotational member 13 of the rotational structure 10.

A pneumatic cylinder 5 having a retractable rod 6 is attached to the support column 2. The pneumatic cylinder 5 is rotatable in parallel with the rotation plane of the support member 4, with the attached part to the support column 2 serving as the center axis. The pneumatic cylinder 5 causes an included piston to move in accordance with the supplied pneumatic pressure, and causes the rod 6 to reciprocate. A distal end of the rod 6 is rotatably attached to a member 42 included in the support member 4. By reciprocation of the rod 6, the support member 4 is rotated about the shaft member 12 of the rotational structure 10. The rotation angle of the support member 4 can be detected by the encoder 20 included in the rotational structure 10. An electrical signal indicating the rotation angle of the support member 4 is output from the circuit board 18. The controller (not illustrated) receives the electrical signal output from the circuit board 18, and controls the pneumatic pressure of the pneumatic cylinder 5 on the basis of the rotation angle detected by the encoder 20.

Figure 8:
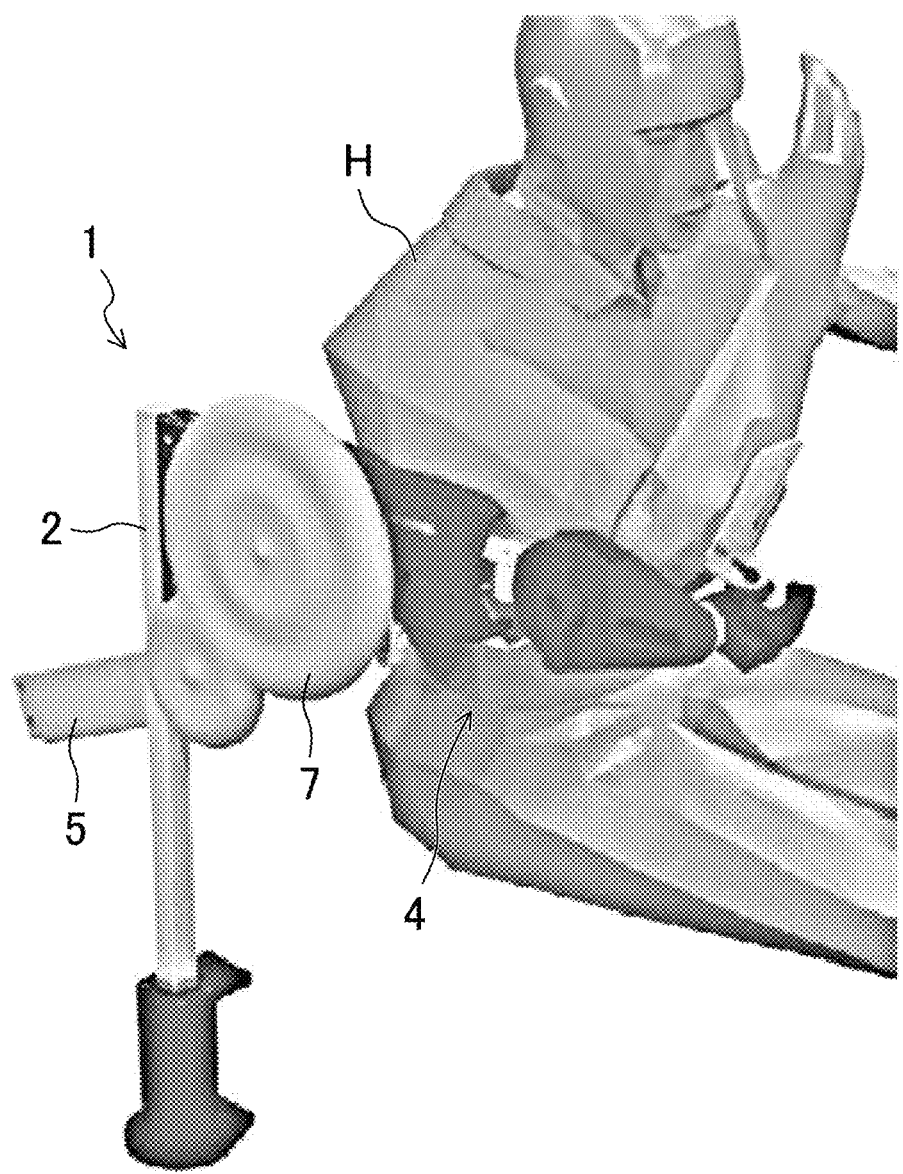
FIG. 8 is a diagram illustrating a state in which the shoulder assist system is actually used.

FIG. 8 is a diagram illustrating a state in which the shoulder assist system 1 of FIG. 7 is actually used. In the state of FIG. 8, the support member 4 supports the arm of the user H. The part of the rotational structure 10 is covered with a cover 7 to maintain a fine appearance.

With this structure, the base member 11 of the rotational structure 10 is coupled with the plate 3 fixed to the support column 2. The support member 4 to support the arm of the user includes a frame 41 coupled with the rotational member 13 of the rotational structure 10. The pneumatic cylinder 5 adjusts the position of the support member 4 with respect to the support column 2, in accordance with the supplied pneumatic pressure. The controller controls the pneumatic pressure of the pneumatic cylinder 6, on the basis of the rotation angle detected by the encoder 20 of the rotational structure 10. Accordingly, control with the controller enables the support member 4 to move to a desired angle with respect to the support column 2.

The target assisted with the assist system described herein is not limited to the shoulder. For example, the assist system may be configured to assist the elbow or the wrist. In the structure of FIG. 7, the pneumatic cylinder 5 has a structure in which the main member thereof is attached to the support column 2 and the distal end of the rod 6 is attached to the member 42 included in the support member 4, but the setting form of the pneumatic cylinder 5 is not limited thereto.

In addition, in the assist system of FIG. 7, the wedge coupling method as described above is used for coupling the frame 41 with the members 42 and 43 forming the support member 4. Groove portions each having a cross section with an inverted T shape are formed in respective side surfaces (upper and lower surfaces in FIG. 7) of the frame 41, and head portions of wedge members to couple the frame 41 with the members 42 and 43 are inserted into the groove portions. This structure enables adjustment of the positions of the members 42 and 43 in the longitudinal direction of the frame 41, in a state in which screws 45 and 46 are loosened.

This structure enables the user to easily adjust the length of the support member 4 from, for example, the side on which the user sits.

In this example, because the pneumatic cylinder 5 is used to drive the support member 4, the rotational structure 10 is back drivable. For this reason, the system serves as a safe system for human. In addition, because the pneumatic cylinder 5 is capable of maintaining the output and supporting the support member 4 by shutting off the valve supplying the pneumatic pressure, the pneumatic cylinder 5 has small energy consumption. An actuator of another method may be used, instead of the pneumatic cylinder 5. For example, the cylinder may be a cylinder using drive by pneumatic pressure and drive by electromagnetic force in combination.

Figure 9:
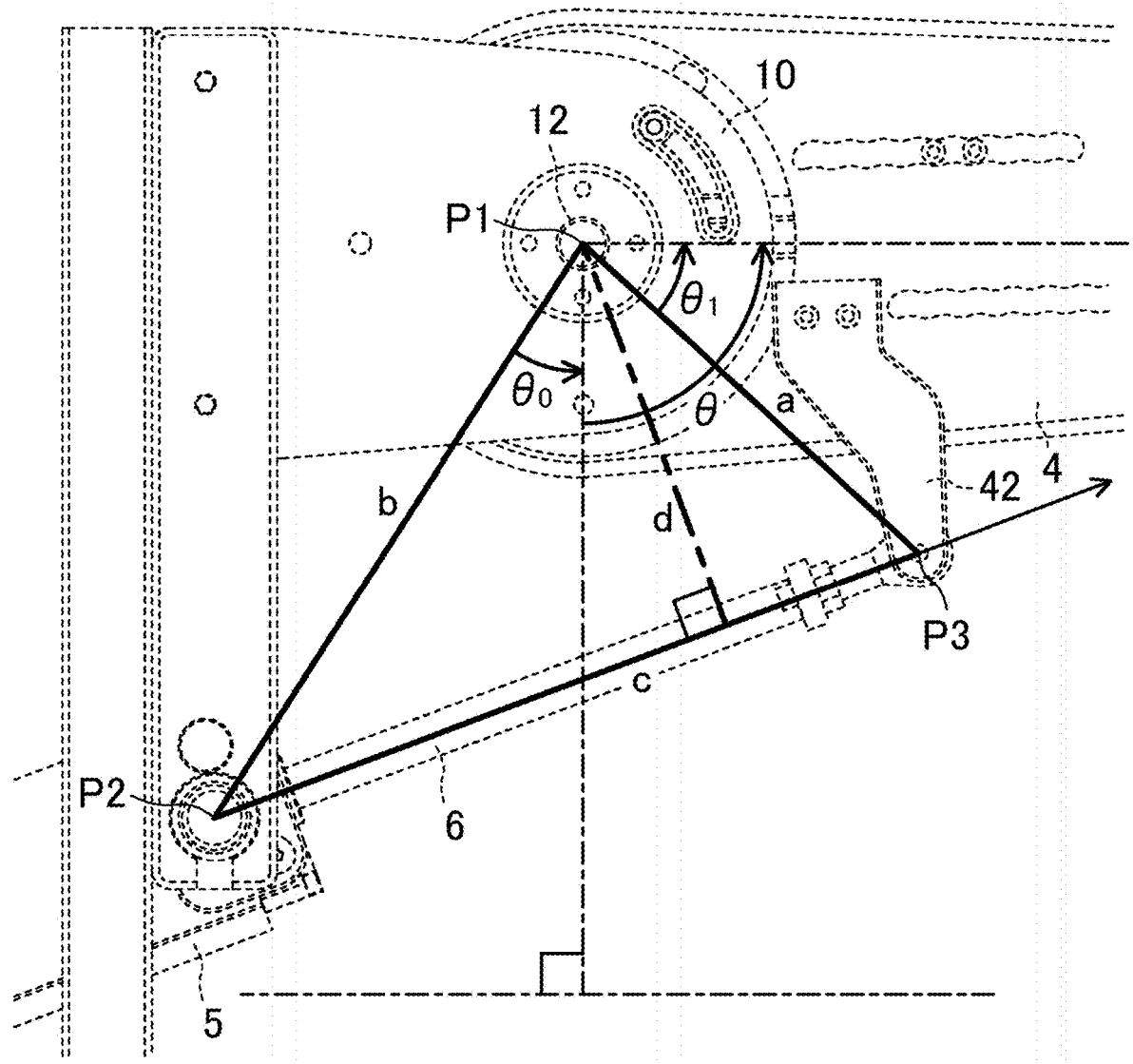
FIG. 9 is a diagram illustrating a geometrical model in the shoulder assist system.

FIG. 9 is a diagram illustrating a geometrical model in the shoulder assist system 1. FIG. 9 is a front view, in which P1 is the position of the shaft member 12 of the rotational structure 10; P2 is the position of the rotational axis of the pneumatic cylinder 5; and P3 is the position of the end portion of the rod 6 of the pneumatic cylinder 5. The length between the positions P1 and P3 is a; the length between the positions P1 and P2 is b; and the length between the positions P2 and P3 is c. The lengths a and b are fixed, and the length c is variable by retraction and extension of the rod 6. Suppose that the encoder 20 included in the rotational structure 10 is capable of detecting an angle $\theta$ made between a direction in which the support member 4 extends and the vertical direction. Angles $\theta_0$ and $\theta_1$ are known.

Torque $\tau$ to lift up the arm of the user H with the support member 4 is expressed as follows using the output f of the pneumatic cylinder 5.

$$\tau = d\ f \qquad \text{[Expression 1]}$$

The letter d is an effective moment arm of the rod 6, and expressed as follows.

$$d = b\sin\left(\arccos\left(\frac{b^2 + c^2 - a^2}{2bc}\right)\right) \qquad \text{[Expression 2]}$$

In addition, c is determined from the following expression.

$$c = \sqrt{a^2 + b^2 - 2ab\cos(\theta_0 + \theta - \theta_1)}$$

As described above, the length c of the rod is determined from the angle $\theta$ of the support member 4, to determine the effective moment arm d of the rod 6. Accordingly, the effective moment arm d of the rod 6 can be determined by detecting the angle $\theta$ of the support member 4, without directly detecting the contraction/extension length of the rod 6. In addition, the gravity compensation torque can be easily determined from the angle $\theta$ of the support member 4.

Figure 10:
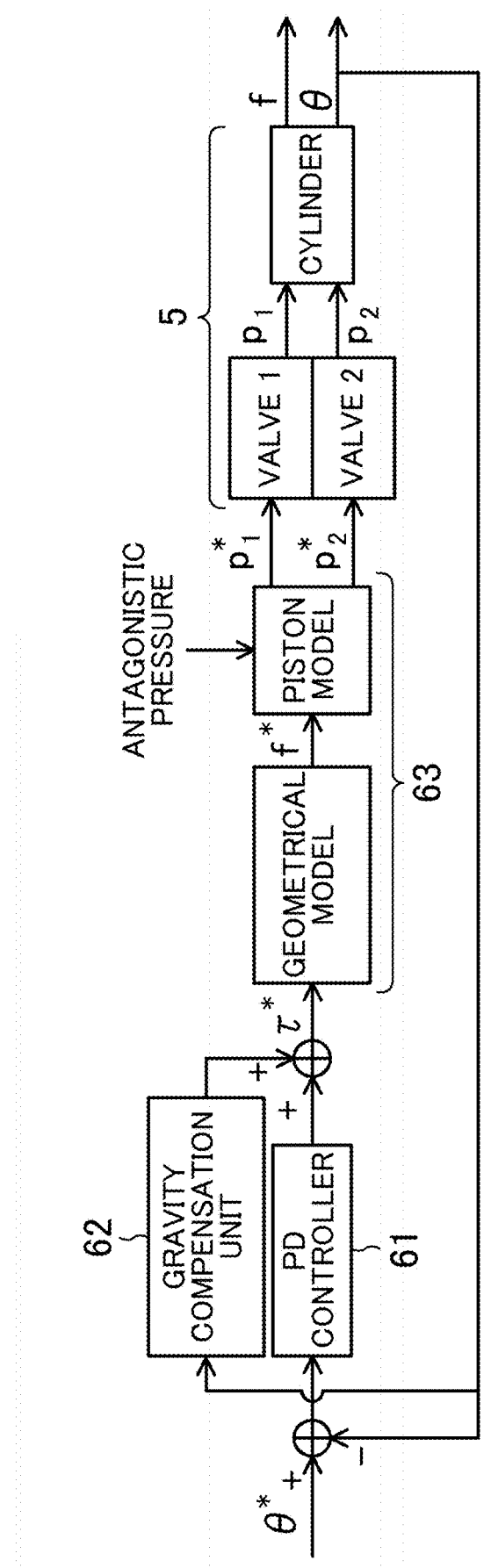
FIG. 10 is a block diagram illustrating an example of a control system of the shoulder assist system.

FIG. 10 is a block diagram illustrating an example of a control system of the shoulder assist system 1. In this example, the pneumatic cylinder 5 is of a two-valve type. In FIG. 10, a PD controller 61 determines the motion torque, in accordance with the difference between the current angle $\theta$ of the support member 4 and a desired angle $\theta^*$. A gravity compensation unit 62 determines the gravity compensation torque, on the basis of the current angle $\theta$ of the support member 4. A cylinder controller 63 determines outputs of pressures p1* and p2* supplied to the pneumatic cylinder 5, from desired torque $\tau^*$ obtained by adding the motion torque to the gravity compensation torque. The functions of the PD controller 61, the gravity compensation unit 62, and the cylinder controller 63 can be achieved with, for example, a notebook computer.

Figure 11:
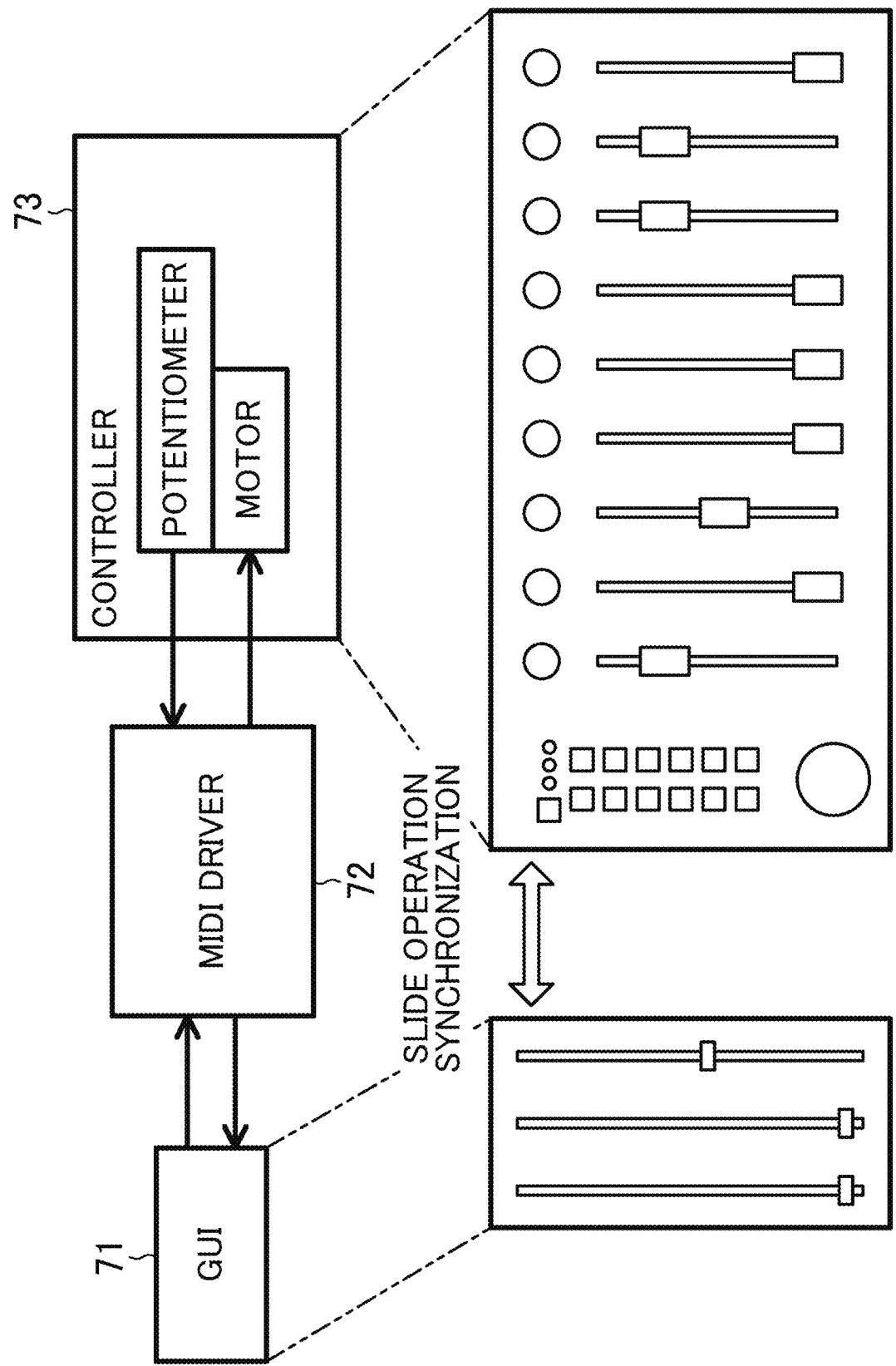
FIG. 11 is a diagram illustrating an example using a controller having a physical slider structure.

As illustrated in FIG. 11, a controller 73 having a physical slider structure may be used to obtain a structure to achieve control of the shoulder assist system 1. For example, a graphic user interface (GUI) 71 of a notebook computer or the like is synchronized with slide operations of the controller 73 with the MIDI driver 72. This structure enables the user or the assistant of the user to easily operate the shoulder assist system 1.

The shoulder assist system 1 explained herein may also be achieved by using a rotational structure with an encoder other than the rotational structure according to the embodiment, as a matter of course.

EXAMPLE 2

Walking Assist System

Figure 12:
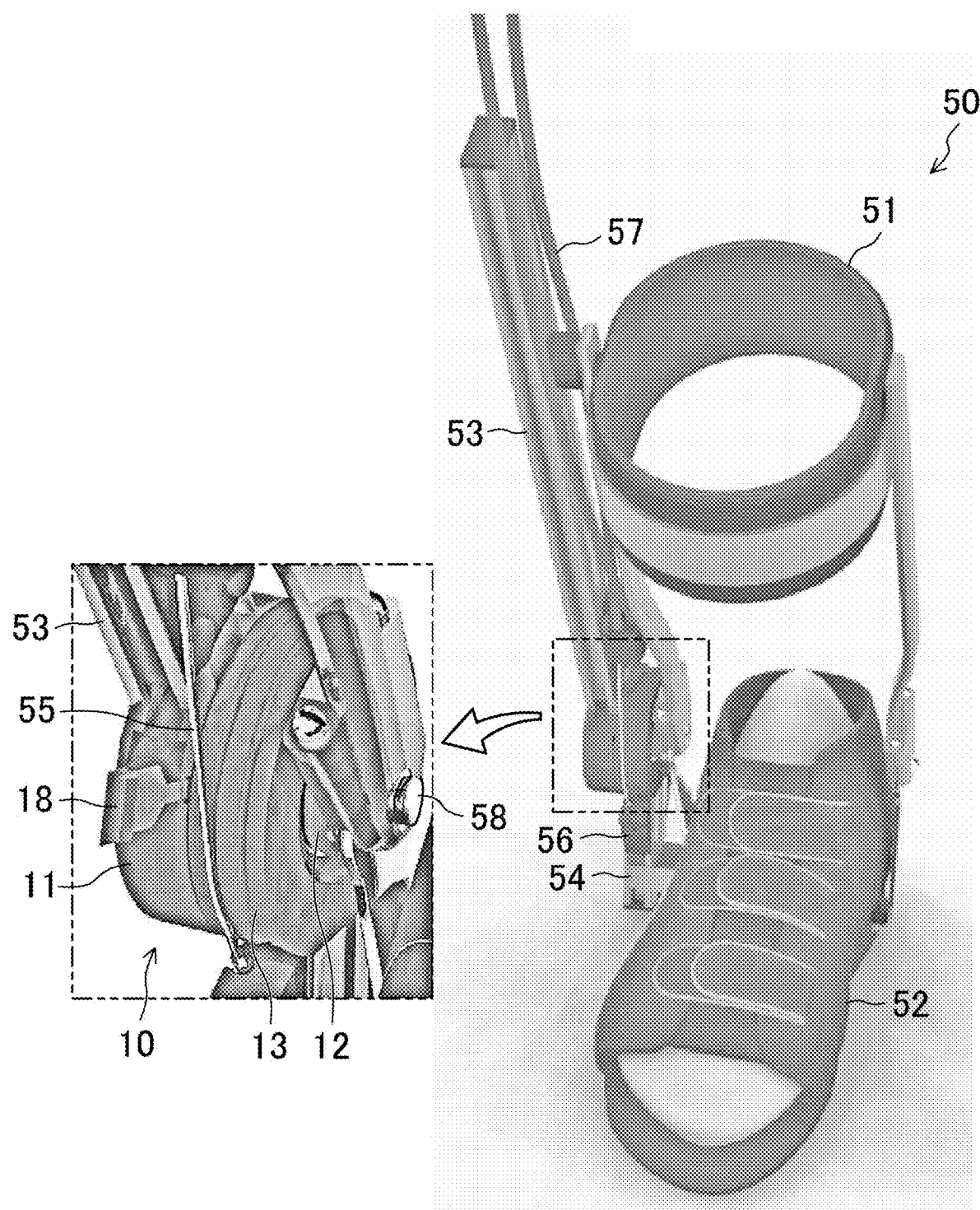
FIG. 12 is a perspective view illustrating a configuration example of a walking assist system.
Figure 13:
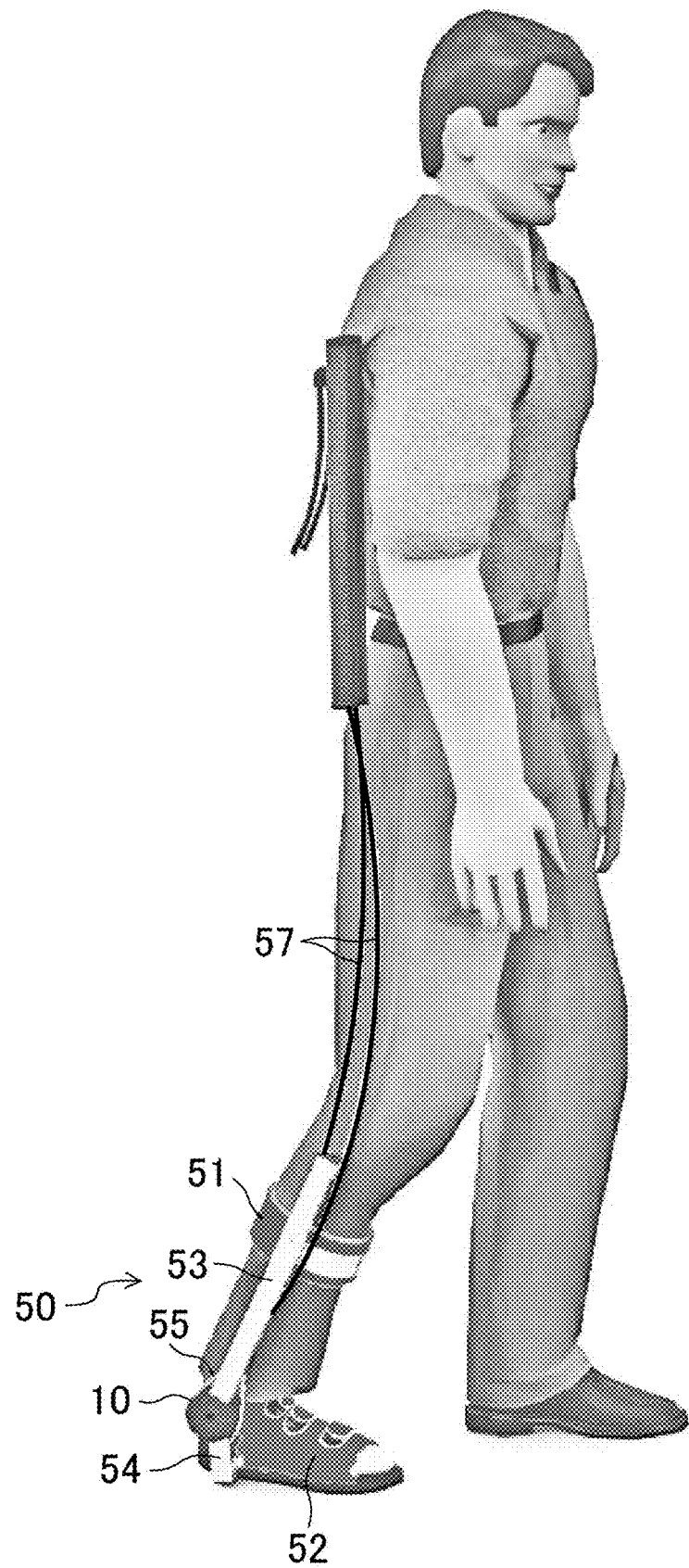
FIG. 13 is a diagram illustrating a state in which the walking assist system is actually used.
Figure 14:
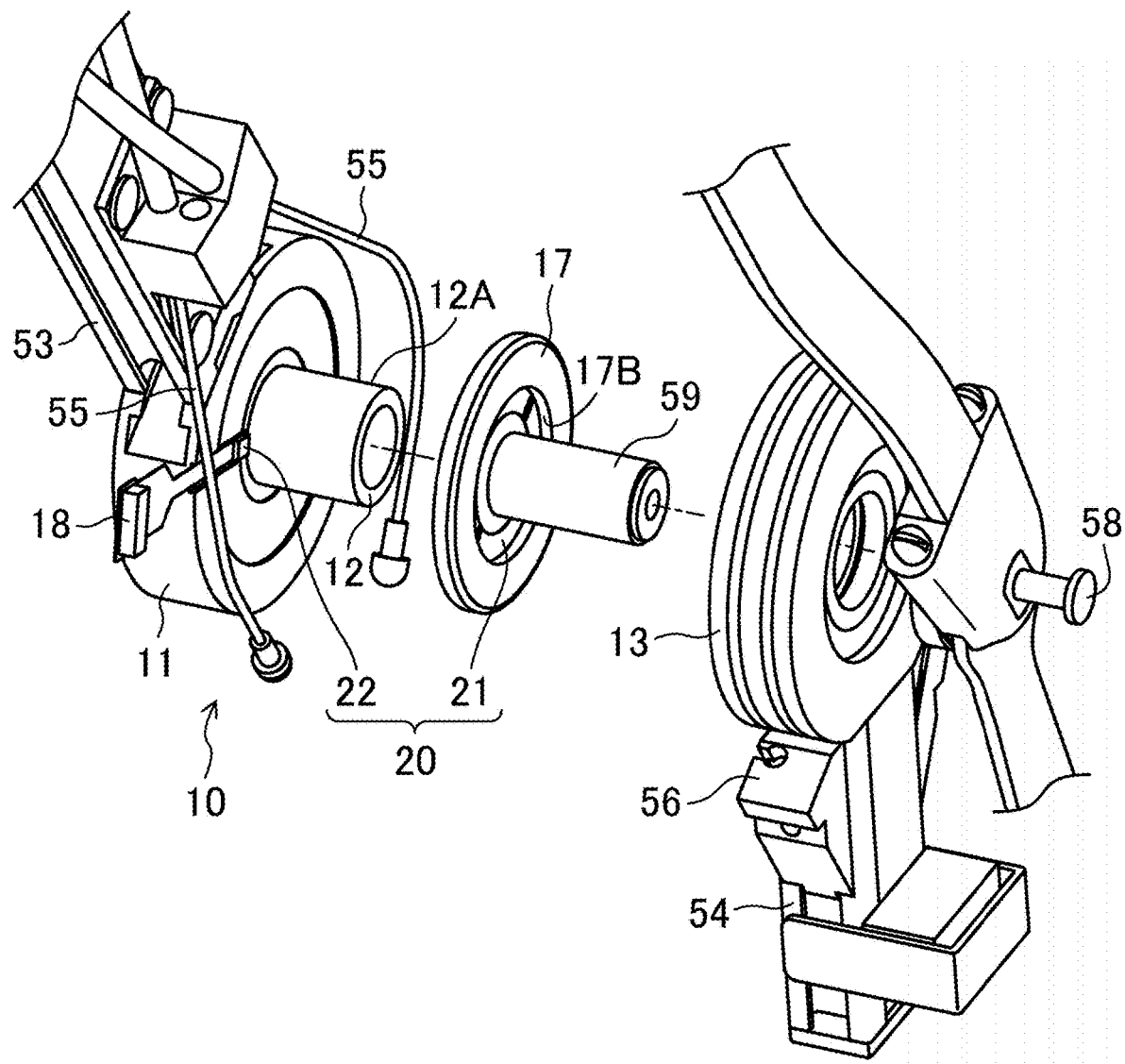
FIG. 14 is an exploded perspective view illustrating a rotational structure and therearound of the walking assist system.

FIG. 12 is a perspective view illustrating a configuration example of a walking assist system. FIG. 13 is a diagram illustrating a state in which the walking assist system is actually used. FIG. 14 is an exploded perspective view illustrating a rotational structure and therearound in the walking assist system. A walking assist system 50 of FIG. 12 includes the rotational structure 10 described above. The walking assist system 50 includes a jig 51 to be fixed to the ankle of the user, a shoe part 52 fixed to the jig 51 and rotatable in a forward and rearward direction, and a frame 53 to which the jig 51 is fixed. The frame 53 is coupled with the base member 11 of the rotational structure 10, and the rotational member 13 of the rotational structure 10 is fixed to a short frame 54. The frame 54 is fixed to a side surface of the shoe part 52. The jig 51 is also fixed to the shaft member 12 of the rotational structure 10.

Reference numeral 55 denotes a Bowden cable, and has one end fixed to a cable-fixing portion 56 provided on the frame 54. Reference numeral 57 denotes a cable cover. As illustrated in FIG. 14, in the rotational structure 10, the reflective scale 21 and the detection element 22 forming the encoder 20 are provided between the internal circumferential surface 17B of the thrust bearing 17 and the external circumferential surface 12A of the shaft member 12, as described above. The detection signal of the encoder 20 is output from the circuit board 18.

Although the joint of the original outfit is fixed with a screw member 58, the rotational structure 10 according to the embodiment enables easy fitting without changing the screw member 58. Specifically, as illustrated in FIG. 14, because the rotational structure 10 has a structure in which the shaft member 12 has a hollow structure, a cylindrical member 59 can be inserted into the shaft member 12. The member 59 is fixed with the screw member 58 from the rotational member 13 side, and fixed also from the outside of the base member 11 by fastening with a screw (not illustrated). Fitting the rotational structure 10 in this manner easily achieves the walking assist system. The drive source is, for example, a pneumatic actuator, or a motor.

The walking assist system 50 explained herein can be achieved using a rotational structure with an encoder other than the rotational structure according to the embodiment, as a matter of course.

(Others)

Figure 15:
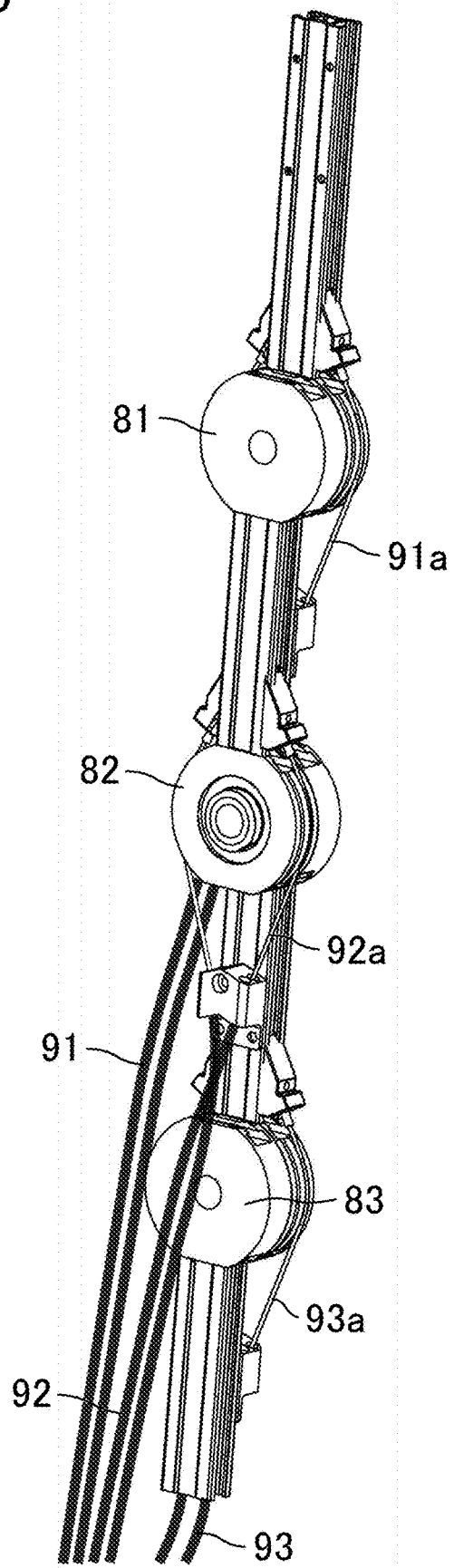
FIG. 15 illustrates a configuration example of a robot using the rotational structure as a joint structure.

FIG. 15 illustrates a configuration example of a robot using the rotational structure described above as the joint structure. The example of FIG. 15 illustrates a structure of a robot arm having three degrees of freedom. Each of three joint structures 81, 82, and 83 includes the rotational structure described above. The joint structure 81 is driven with a Bowden cable 91 including an inner cable 91a. The joint structure 82 is driven with a Bowden cable 92 including an inner cable 92a. The joint structure 83 is driven with a Bowden cable 93 including an inner cable 93a. The joint structures 81, 82, and 83 can be driven in both rotational directions with the Bowden cables 91, 92, and 93, respectively.

As other examples, the rotational structure described above may be used for a rotational shaft part of a goniometer, or may be used for a mechanism part performing continuous rotations, such as a rotational part of a coil winder.

<Rotational Structure using Cross Roller Bearing>

The structure disclosed in the embodiment described above may also be applied to a rotational structure using a cross roller bearing. A cross roller bearing is capable of receiving radial load in addition to thrust load, and formed in a compact structure. Using a cross roller bearing achieves a more compact rotational structure including an encoder.

Figure 16:
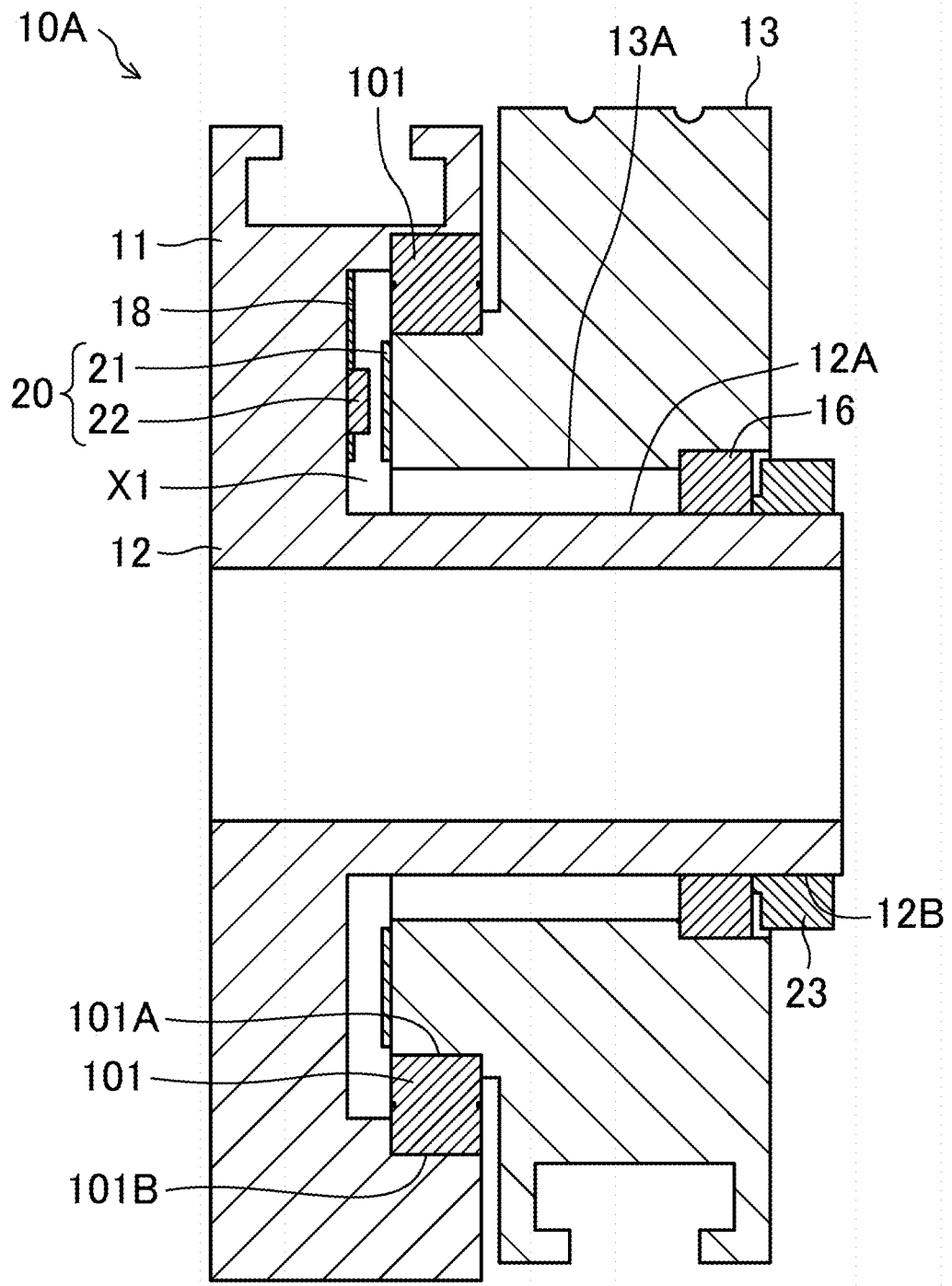
FIG. 16 is a schematic cross-sectional view illustrating an example of a rotational structure using a cross roller bearing.

FIG. 16 is a schematic cross-sectional view illustrating an example of a rotational structure 10A using a cross roller bearing. The base member 11 is fixed to the shaft member 12 with a screw or the like. The base member 11 and the shaft member 12 may be formed as one unitary component. The shaft member 12 has a hollow structure, and is pierced in an axial direction. The rotational member 13 is attached to the shaft member 12, with the bearing 16 interposed therebetween. Specifically, the shaft member 12 is inserted into the hole 13A of the rotational member 13, and the annular bearing 16 is provided between the external circumferential surface 12A of the shaft member 12 and the internal circumferential surface of the hole 13A.

In addition, an annular cross roller bearing 101 is provided between the base member 11 and the rotational member 13. In the rotational structure 10A of FIG. 16, the rotational member 13 abuts against an internal circumferential surface 101A of the cross roller bearing 101, and the base member 11 abuts against the external circumferential surface of the cross roller bearing 101. In addition, a hollow portion X1, in which the base member 11 is opposed to the rotational member 13, is formed around the shaft member 12. In this example, the hollow portion X1 is formed in an annular shape. In the hollow portion X1, the encoder 20 detecting the rotation angle of the rotational member 13 is provided inner than the internal circumferential surface 101A of the cross roller bearing 101.

The encoder 20 is an optical reflection encoder, in this example. The encoder 20 includes the reflective scale 21 serving as an example of the detection target member, and the detection element 22 serving as an example of the detector. The reflective scale 21 has an annular shape, and fixed to the surface of the rotational member 13 in the hollow portion X1. The detection element 22 is disposed in a position opposed to part of the reflective scale 21 in the surface of the base member 11, in the hollow portion X1. The detection element 22 projects light, receives reflected light in the reflective scale 21, and transmits an electrical signal corresponding to the reflected light to the circuit board 18. A distal end of the shaft member 12 is provided with a male screw portion 12B, and a nut 23 holds the rotational structure 10A.

In the rotational structure 10A, the rotational member 13 abuts against the internal circumferential surface 101A of the cross roller bearing 101, and the base member 11 abuts against the external circumferential surface of the cross roller bearing 101. This structure further increases the space of the hollow portion X1 where the encoder 20 can be used, in comparison with the case where the rotational member 13 abuts against the external circumferential surface of the cross roller bearing 101 to form the hollow portion. This structure enables use of the cross roller bearing 101 having a large diameter. In addition, this structure increases the resolution of the encoder 20, because the scale 21 is disposed in a more external circumferential position.

The structure of FIG. 16 also produces advantageous effects similar to those of the rotational structure 10 illustrated in FIG. 2. Similarly to the rotational structure illustrated in FIG. 2, the positions of the reflective scale 21 and the detection element 22 may be changed. Specifically, the reflective scale 21 may be provided on the base member 11 side, and the detection element 22 may be provided on the rotational member 13 side. In addition, similarly to the rotational structure illustrated in FIG. 2, the encoder 20 is not limited to an optical reflection encoder, but may be, for example, an optical transmission encoder. As another example, the encoder may be a magnetic encoder or an electric-resistance type encoder. Specifically, the detection target member included in the encoder may be any one having a physical quantity changing in the circumferential direction, and the detection element may be any element capable of detecting a physical quantity of the detection target member.

In the rotational structure 10A of FIG. 16, the encoder 20 may be positioned inside the cross roller bearing 101. Specifically, in the axial direction, a space between the opposed scale 21 and the detection element 22 may overlap a range in which the cross roller bearing 101 is provided. In this manner, when a predetermined width is required for the scale 21 and the detection element 22, at least part of the width in which the cross roller bearing 101 is disposed is shared in the axial direction. This structure enables shortening of the shaft member 12 in the axial direction, and formation of the rotational structure 10A with a compact structure.

Figure 17:
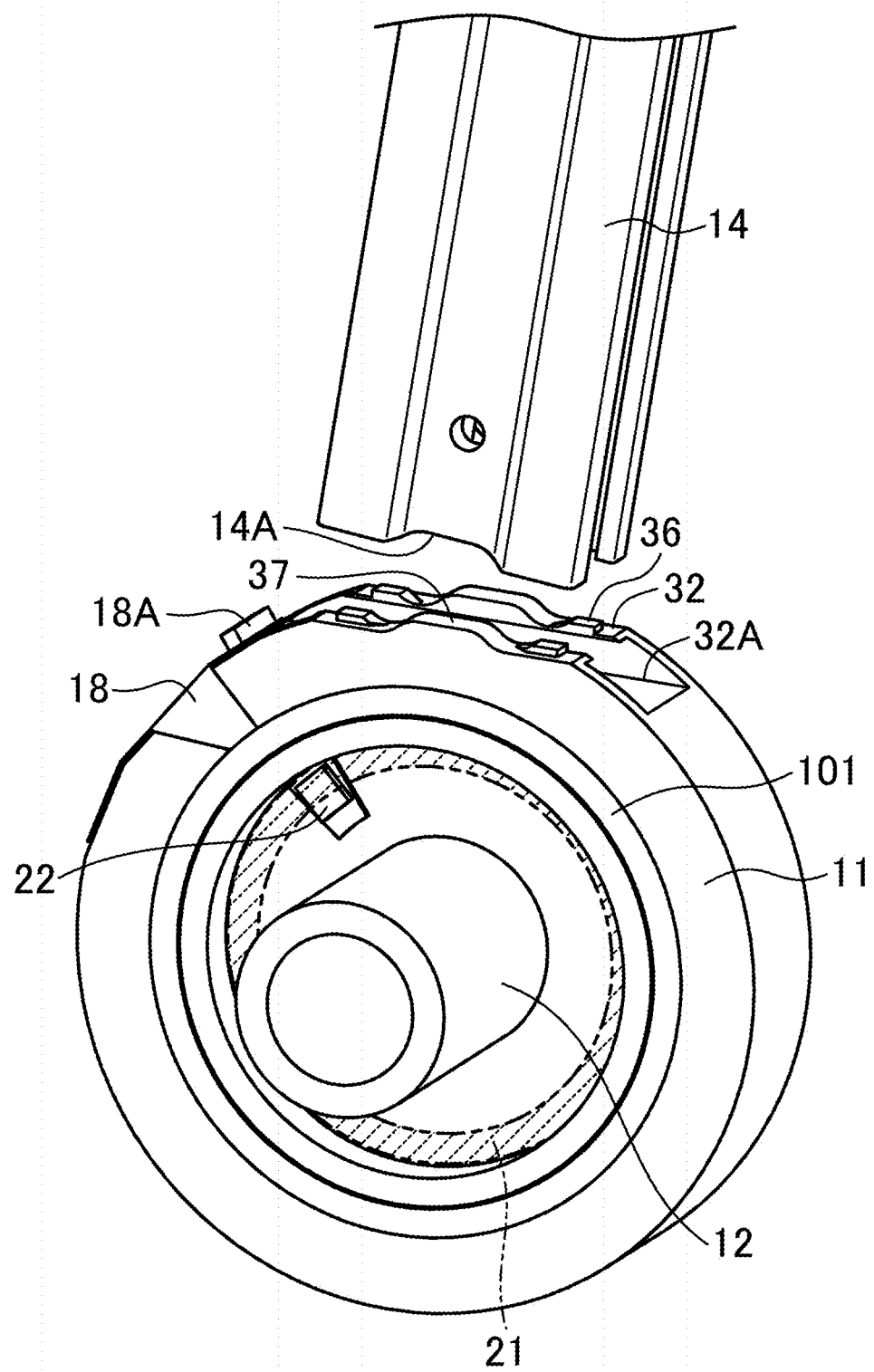
FIG. 17 is a diagram illustrating a state in which the rotational structure using the cross roller bearing is exploded.

FIG. 17 is a perspective view illustrating a state in which the rotational member 13 is removed in the rotational structure 10A. In FIG. 17, broken lines illustrate the position in which the reflective scale 21 is disposed. The detection element 22 is provided inside the cross roller bearing 101, and in a direction to project light toward the rotational member 13. Wires of the detection element 22 run under the cross roller bearing 101, and are connected with the circuit board 18. A connector 18A to take out an electrical signal is provided on the circuit board 18. The positioning of the detection element 22 may be performed by, for example, forming an attaching groove in the base member 11. The positioning of the reflective scale 21 may be performed using, for example, a positioning pin.

FIG. 17 also illustrates the shape of the coupling surface 32 coupling the base member 11 with the frame 14. The coupling surface 32 is provided with a groove portion 32A having a cross section with an inverted T shape, and provided with a projection portion 36 abutting against the side surface of the frame 14. In addition, a center portion 37 of the coupling surface 32 bulges outward. In addition, a center portion 14A of the end surface of the frame 14 has a recessed portion to fit with the shape of the center portion 37 bulging outward. With the structure in which the center portion 37 of the coupling surface 32 bulges outward, it is possible to provide the cross-roller bearing 101 with a larger diameter in the rotational structure 10A. This structure improves the withstanding load of the rotational structure 10A.

DESCRIPTION OF REFERENCE CHARACTERS

1 Shoulder Assist System (Assist System)
2 Support Column (Base)
3 Plate (Base)
4 Support Member
5 Pneumatic Cylinder
6 Rod
10 Rotational Structure
10A Rotational Structure
11 Base Member
12 Shaft Member
12A External Circumferential Surface
13 Rotational Member
16 Bearing
17 Thrust Bearing
17D Internal Circumferential Surface
20 Encoder
21 Reflective Scale (Detection Target Member)
22 Detection Element (Detector)
24 Light Transmission Optical Fiber
25 Light Reception Optical Fiber
26 Slit (Transmission Scale, Detection Target Member)
31 Wedge Member
31a Head Portion
31b Trunk Portion
31A Through Hole
32 Coupling Surface
32A Groove Portion
33 Screw
33A Tapered Portion
35A Hole
36 Projection Portion
41 Frame
42 Member
101 Cross Roller Bearing
101A Internal Circumferential Surface
101B External Circumferential Surface
X Hollow Portion
X1 Hollow Portion

The invention claimed is:

1. A rotational structure comprising:
a base member;
a shaft member including one end fixed to the base member, and extending in an axial direction of the rotational structure;
a rotational member attached to the shaft member through a bearing, and rotatable about the shaft member;
an encoder configured to detect a rotation angle of the rotational member; and
an annular thrust bearing provided to surround the shaft member, between the base member and the rotational member,
wherein
a hollow portion, in which the base member is opposed to the rotational member, is formed around the shaft member inside the rotational structure and between an internal circumferential surface of the thrust bearing and an external circumferential surface of the shaft member,
the encoder includes:
a detection target member provided around the shaft member in the hollow portion such that the detection target member is rotated together with one of the rotational member and the base member, and having a physical quantity changing in a circumferential direction; and
a detector capable of detecting the physical quantity of the detection target element, and provided at a position in the hollow portion where the physical quantity of the detection target member is detectable, such that the detector is rotated together with the other of the rotational member and the base member, the detection target member and the detector are opposed to each other in the axial direction, and a space between the detection target member and the detector overlaps a range in which the thrust bearing is provided, in the axial direction.

2. The rotational structure of claim 1, wherein
the encoder is an optical encoder,
the detection target member is a reflective scale provided with gradations such that light reflectance periodically changes in the circumferential direction, or a transmission scale provided with gradations such that light transmittance periodically changes in the circumferential direction, and
the detector is a detection element applying light to the reflective scale or the transmission scale, receiving reflected light or transmitted light, and outputting an electrical signal corresponding to the reflected light or the transmitted light.

3. The rotational structure of claim 1, wherein
the encoder is an optical encoder,
the detection target member is a reflective scale provided with gradations such that light reflectance periodically changes in the circumferential direction, or a transmission scale provided with gradations such that light transmittance periodically changes in the circumferential direction, and
the detector includes a light transmission optical fiber applying light to the reflective scale or the transmission scale, and a light reception optical fiber receiving reflected light or transmitted light.

4. The rotational structure of claim 1, wherein
the thrust bearing is a shielded bearing or a sealed bearing.

5. The rotational structure of claim 1, wherein
the hollow portion is sealed with respect to outside of the rotational structure.

6. The rotational structure of claim 1, wherein
the encoder is an optical encoder, and
the hollow portion is shielded from light such that no light enters from outside of the rotational structure.

7. The rotational structure of claim 1, wherein
the shaft member has a hollow structure pierced in the axial direction.

8. A robot comprising:
the rotational structure of claim 1, the rotational structure serving as a joint structure.

9. A rotational structure comprising:
a base member;
a shaft member including one end fixed to the base member, and extending in an axial direction of the rotational structure;
a rotational member attached to the shaft member through a bearing, and rotatable about the shaft member;
an encoder configured to detect a rotation angle of the rotational member; and
an annular thrust bearing or an annular cross roller bearing provided between the base member and the rotational member so as to surround the shaft member, wherein
a hollow portion, in which the base member is opposed to the rotational member, is formed around the shaft member inside the rotational structure, and
the encoder includes:
a detection target member provided around the shaft member in the hollow portion such that the detection target member is rotated together with one of the rotational member and the base member, and having a physical quantity changing in a circumferential direction; and
a detector capable of detecting the physical quantity of the detection target element, and provided at a position in the hollow portion where the physical quantity of the detection target member is detectable, such that the detector is rotated together with the other of the rotational member and the base member,
the detection target and the detector are opposed to each other in the axial direction, and
the detection target and the detector are provided inner than an internal circumferential surface of the thrust bearing or the cross roller bearing.

10. A robot comprising:
the rotational structure of claim 9, the rotational structure serving as a joint structure.

11. A rotational structure comprising:
a base member;
a shaft member including one end fixed to the base member, and extending in an axial direction of the rotational structure; and
a rotational member attached to the shaft member through a bearing, and rotatable about the shaft member,
wherein
at least one of the base member and the rotational member is provided with a coupling surface serving as a plane to couple a different member, in an external circumferential surface thereof in a circumferential direction of the shaft member, and
the coupling surface is provided with a groove portion having a cross section with an inverted T shape, wherein
the different member is coupled with the coupling surface using a T-shaped wedge member including a head portion with a projection and a trunk portion provided with a through hole,
in coupling, the head portion of the wedge member is inserted into the groove portion, the trunk portion is inserted into a hole formed in an end surface of the different member, and the wedge member is fixed to the different member with a screw extending through the through hole and including a tapered portion, and
at least one of the base member and the rotational member is provided with a projection portion on a surface of the coupling surface, the projection portion abutting against a side surface of the different member in coupling.

12. A robot comprising:
the rotational structure of claim 11, the rotational structure serving as a joint structure.

13. A rotational structure comprising:
a base member;
a shaft member including one end fixed to the base member, and extending in an axial direction of the rotational structure; and
a rotational member attached to the shaft member through a bearing, and rotatable about the shaft member,
wherein
at least one of the base member and the rotational member is provided with a coupling surface serving as a plane to couple a different member, in an external circumferential surface thereof in a circumferential direction of the shaft member, and
the coupling surface is provided with a groove portion having a cross section with an inverted T shape, wherein at least one of the base member and the rotational member is provided with a projection on a surface of the coupling surface, the projection portion abutting against a side surface of the different member in coupling.

14. A robot comprising:
the rotational structure of claim 13, the rotational structure serving as a joint structure.

15. An assist system comprising:
a base;
a rotational structure including a base member, a shaft member including one end fixed to the base member, a rotational member attached to the shaft member through a bearing and rotatable about the shaft member, and an encoder configured to detect a rotation angle of the rotational member, the base member being coupled with the base;
a support member configured to support an arm of a user, and including a frame coupled with the rotational member;
a pneumatic cylinder provided to enable adjustment of a position of the support member with respect to the base, in accordance with supplied pneumatic pressure; and
a controller configured to control the pneumatic pressure of the pneumatic cylinder on the basis of the rotation angle detected by the encoder of the rotational structure.

16. The assist system of claim 15, wherein
the shaft member extending in an axial direction of the rotational structure, and
the rotational structure comprises:
an annular thrust bearing provided to surround the shaft member, between the base member and the rotational member,
wherein
a hollow portion, in which the base member is opposed to the rotational member, is formed around the shaft member inside the rotational structure and between an internal circumferential surface of the thrust bearing and an external circumferential surface of the shaft member,
the encoder includes:
a detection target member provided around the shaft member in the hollow portion such that the detection target member is rotated together with one of the rotational member and the base member, and having a physical quantity changing in a circumferential direction; and
a detector capable of detecting the physical quantity of the detection target element, and provided at a position in the hollow portion where the physical quantity of the detection target member is detectable, such that the detector is rotated together with the other of the rotational member and the base member,
the detection target member and the detector are opposed to each other in the axial direction, and
a space between the detection target member and the detector overlaps a range in which the thrust bearing is provided, in the axial direction.

17. The assist system of claim 15, wherein
the shaft member extending in an axial direction of the rotational structure, and
the rotational structure comprises:
an annular thrust bearing or an annular cross roller bearing provided between the base member and the rotational member so as to surround the shaft member,
wherein
a hollow portion, in which the base member is opposed to the rotational member, is formed around the shaft member inside the rotational structure, and
the encoder includes:
a detection target member provided around the shaft member in the hollow portion such that the detection target member is rotated together with one of the rotational member and the base member, and having a physical quantity changing in a circumferential direction; and
a detector capable of detecting the physical quantity of the detection target element, and provided at a position in the hollow portion where the physical quantity of the detection target member is detectable, such that the detector is rotated together with the other of the rotational member and the base member,
the detection target and the detector are opposed to each other in the axial direction, and
the detection target and the detector are provided inner than an internal circumferential surface of the thrust bearing or the cross roller bearing.

18. The assist system of claim 15, wherein
the shaft member extending in an axial direction of the rotational structure,
wherein
at least one of the base member and the rotational member is provided with a coupling surface serving as a plane to couple a different member, in an external circumferential surface thereof in a circumferential direction of the shaft member, and
the coupling surface is provided with a groove portion having a cross section with an inverted T shape.

* * * * *